US012287965B2

(12) United States Patent
Adler et al.

(10) Patent No.: US 12,287,965 B2
(45) Date of Patent: Apr. 29, 2025

(54) DYNAMIC GROUP MEMBERSHIP FOR DEVICES

(71) Applicant: Apple Inc., Cupertino, CA (US)

(72) Inventors: Mitchell D. Adler, Cupertino, CA (US); Michael Brouwer, San Jose, CA (US); Andrew R. Whalley, San Francisco, CA (US); John C. Hurley, Santa Clara, CA (US); Richard F. Murphy, Boulder Creek, CA (US); David P. Finkelstein, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/304,309

(22) Filed: Apr. 20, 2023

(65) Prior Publication Data
US 2023/0259276 A1 Aug. 17, 2023

Related U.S. Application Data

(63) Continuation of application No. 16/427,235, filed on May 30, 2019, now Pat. No. 11,669,244, which is a
(Continued)

(51) Int. Cl.
*G06F 3/06* (2006.01)
*G06Q 10/06* (2023.01)
(Continued)

(52) U.S. Cl.
CPC ............ *G06F 3/0604* (2013.01); *G06F 3/065* (2013.01); *G06F 3/0683* (2013.01); *G06Q 10/06* (2013.01);
(Continued)

(58) Field of Classification Search
CPC ...... G06F 3/0604; G06F 3/065; G06F 3/0683; G06Q 10/06; G06Q 10/10; G06Q 90/00;
(Continued)

(56) References Cited

U.S. PATENT DOCUMENTS 6,671,695 B2   12/2003   McFadden et al.
6,732,144 B1   5/2004    Kizu et al.
(Continued)

FOREIGN PATENT DOCUMENTS

CN   1682174 A     10/2005
CN   102036181 A   4/2011
(Continued)

OTHER PUBLICATIONS

International Patent Application No. PCT/US2016/025431—International Search Report and Written Opinion dated Jul. 4, 2016.
(Continued)

*Primary Examiner* — Oleg Korsak
*Assistant Examiner* — Devin E Alme
(74) *Attorney, Agent, or Firm* — Kubota & Basol LLP

(57) ABSTRACT

Some embodiments provide a method for a first device that identifies definitions of different groups of devices, each of which is defined by a set of properties required for a device to be a member. The method monitors properties of the first device to determine when the device is eligible for membership in a group. When the first device is eligible for membership in a first group of which the device is not a member, the method sends an application for membership in the first group signed with at least a private key of the device to at least one other device that is a member of the first group. When the first device becomes ineligible for membership in a second group of which the first device is a member, the method removes the device from the second group and notifies other devices that are members of the second group.

17 Claims, 20 Drawing Sheets

Related U.S. Application Data continuation of application No. 14/872,022, filed on Sep. 30, 2015, now Pat. No. 10,318,154.

(60) Provisional application No. 62/172,127, filed on Jun. 7, 2015, provisional application No. 62/168,893, filed on May 31, 2015.

(51) Int. Cl.
| | |
|---|---|
| *G06Q 10/10* | (2023.01) |
| *G06Q 90/00* | (2006.01) |
| *H04L 9/32* | (2006.01) |
| *H04L 67/1095* | (2022.01) |
| *H04W 4/08* | (2009.01) |
| *H04L 67/104* | (2022.01) |

(52) U.S. Cl.
CPC ............ *G06Q 10/10* (2013.01); *G06Q 90/00* (2013.01); *H04L 9/3268* (2013.01); *H04L 67/1095* (2013.01); *H04W 4/08* (2013.01); *H04L 67/1044* (2013.01)

(58) Field of Classification Search
CPC ............... H04L 9/3268; H04L 67/1095; H04L 67/1044; H04W 4/08
See application file for complete search history.

(56) References Cited

U.S. PATENT DOCUMENTS

| | | | |
|---|---|---|---|
| 7,346,705 | B2 | 3/2008 | Hullot et al. |
| 7,441,117 | B2 | 10/2008 | Matsuzaki et al. |
| 7,526,649 | B2 | 4/2009 | Wiseman et al. |
| 8,458,462 | B1 | 6/2013 | Hanna et al. |
| 8,892,653 | B2 | 11/2014 | Mallet et al. |
| 9,054,919 | B2 | 6/2015 | Kiang et al. |
| 9,077,644 | B2 | 7/2015 | Kreiner et al. |
| 9,077,759 | B2 | 7/2015 | Brouwer et al. |
| 9,124,637 | B2 | 9/2015 | Brouwer et al. |
| 10,198,182 | B2 | 2/2019 | Adler et al. |
| 10,318,154 | B2 | 6/2019 | Adler et al. |
| 2002/0143944 | A1 | 10/2002 | Traversat et al. |
| 2004/0133640 | A1 | 7/2004 | Yeager et al. |
| 2007/0019616 | A1 | 1/2007 | Rantapuska et al. |
| 2009/0094367 | A1* | 4/2009 | Song ............... H04L 12/1818 709/227 |
| 2009/0158041 | A1 | 6/2009 | Kang et al. |
| 2009/0262674 | A1 | 10/2009 | Suzuki |
| 2010/0161974 | A1 | 6/2010 | Lee et al. |
| 2013/0036211 | A1 | 2/2013 | Messer et al. |
| 2013/0067243 | A1 | 3/2013 | Tamayo-Rios et al. |
| 2013/0290948 | A1 | 10/2013 | Gokhale et al. |
| 2013/0332607 | A1 | 12/2013 | Santamaria et al. |
| 2014/0053227 | A1 | 2/2014 | Ruppin et al. |
| 2014/0208434 | A1* | 7/2014 | Brouwer ............ H04L 63/10 726/26 |
| 2014/0281540 | A1* | 9/2014 | Brouwer ............ H04L 63/065 713/169 |
| 2014/0289528 | A1* | 9/2014 | Baghdasaryan ...... H04L 9/3297 713/171 |
| 2014/0289833 | A1* | 9/2014 | Briceno ............ H04W 12/06 726/5 |
| 2015/0215398 | A1* | 7/2015 | Chang ............... H04L 63/083 726/8 |
| 2015/0222700 | A1 | 8/2015 | Kay et al. |
| 2015/0350106 | A1 | 12/2015 | Whalley |
| 2016/0162279 | A1 | 6/2016 | Zamir |
| 2016/0349999 | A1 | 12/2016 | Adler et al. |
| 2016/0352526 | A1 | 12/2016 | Adler et al. |
| 2016/0359965 | A1 | 12/2016 | Murphy et al. |

FOREIGN PATENT DOCUMENTS

| | | |
|---|---|---|
| KR | 20100071666 A | 6/2010 |
| WO | 2016195798 A1 | 12/2016 |

OTHER PUBLICATIONS

Author Unknown, "iOS Security," Oct. 1, 2014, pp. 1-50, Apple Inc., US, available at https://www.apple.com/br/privacy/docs/IOS_Security_Guide_Oct_2014.pdf.

Takin, Halil Kemal, "End-to-end Encrypted Communication Between Multi-devise Users," 7th International Conference on Information Security and Cryptology, Oct. 14, 2014, pp. 173-177, Istanbul, Turkey, available at http://iscturkey.org/wpcontent/uploads/2016/03/isc2014-51.pdf.

International Patent Application No. PCT/US2016/025440—International Search Report and Written Opinion dated Jul. 1, 2016.

European Patent Application No. 16718754.1—Examination Report dated Sep. 23, 2019.

Korean Patent Application No. 10-2019-7023625—Notice of Preliminary Rejection dated Aug. 19, 2019.

Chinese Patent Application No. 201680031832.7—Notification to Grant Patent Right dated Apr. 14, 2021.

Korean Patent Application No. 10-2021-7005075—Notice of Preliminary Rejection dated May 30, 2021.

Korean Patent Application No. 10-2022-7008901—Notice of Allolwance dated Jul. 27, 2022.

Mario Di Raimondo et al., "Secure Off-the-Record Messaging," WPES05 (Nov. 7, 2005).

\* cited by examiner

Ring 3: Password at least 12 characters, User Approval

Ring 4: Enterprise profile configuration installed, Knows cloud services account password Figure 21 | Figure 21A / Figure 21B

DYNAMIC GROUP MEMBERSHIP FOR DEVICES

CROSS-REFERENCE TO RELATED APPLICATIONS

The present application is a continuation of U.S. patent application Ser. No. 16/427,235, filed May 30, 2019, entitled "DYNAMIC GROUP MEMBERSHIP FOR DEVICES," which is a continuation of U.S. application Ser. No. 14/872,022, filed Sep. 30, 2015, entitled "DYNAMIC GROUP MEMBERSHIP FOR DEVICES," issued Jun. 11, 2019 as U.S. Pat. No. 10,318,154, which claims the benefit of U.S. Provisional Application No. 62/172,127, filed Jun. 7, 2015, entitled "MULTIPLE SYNCHRONIZATION GROUPS AMONG DEVICES," and U.S. Provisional Application No. 62/168,893, filed May 31, 2015, entitled "MULTIPLE SYNCHRONIZATION GROUPS AMONG DEVICES," the contents of which are incorporated herein by reference in their entirety for all purposes.

BACKGROUND

A user that owns multiple devices with overlapping functionality is becoming increasingly common. Smartphones, tablets, and computers all access the web, allow a user to process photos, etc., and users tend to have several such devices. Thus, a user wanting to share data between their devices and have access to data on multiple devices is increasingly common as well. Users may commonly use all sorts of different techniques to transfer data between devices, such as flash memory sticks, e-mail, etc. More efficient techniques for automatically sharing data between a user's devices are desired.

SUMMARY

Some embodiments provide a method for synchronizing data items between a set of related electronic devices. Specifically, some embodiments define verification sub-groups that devices may join if the devices satisfy membership requirements for the verification sub-groups, and use the verification sub-groups to define synchronization sub-groups in which the devices participate. Different synchronization sub-groups, in some embodiments, define different types of data items that the devices participating in the synchronization sub-groups share with each other via synchronization processes.

In some embodiments, the set of related electronic devices includes all devices that a user associates with a third-party service (e.g., with a particular cloud services account of the user). Knowledge of the cloud services account password serves as a requirement for membership in at least one of the verification sub-groups of some embodiments, while some embodiments define additional verification sub-groups that the various devices may join. Different embodiments define different sets of requirements for joining such additional verification sub-groups, including requirements that a device have a particular operating system, have a particular level of password strength, have a secure processor, or other device configuration properties. Some embodiments require that a device prove possession of a particular cryptographic secret in order to join a particular verification sub-group (e.g., possession of a key provided with an enterprise profile in order to join a verification sub-group defined by the enterprise), or that a user verify the membership of a new device on a device already established in the verification sub-group. In addition, some verification sub-groups may require that a new device verify a property of itself to an established device via an out-of-band process (e.g., by using a third party for verification).

For a device to join a verification sub-group, some embodiments require the device to sign a request to join the sub-group and have the request approved by one of the devices already in the verification sub-group. For example, in some embodiments when a device meets the requirements for a verification sub-group that requires possession of a cryptographic secret, the device (i) signs its public key (which has already been shared with the other devices) and a date/time of application to the sub-group with a private key generated from the cryptographic secret, (ii) packages this signature with its identity used for joining the verification sub-group, and (iii) signs the identity with its own private key. This signature is then sent to the other devices in the verification sub-group as a request to join the sub-group. When one of the other devices verifies that the requesting device does meet all of the requirements for joining the sub-group, the established device notifies the other devices in the verification sub-group, including the new device being added. In some embodiments, this notification includes a list of the members of the verification sub-group, including the new device.

Devices may be members of multiple verification sub-groups in some embodiments. In addition, devices may dynamically move in and out of such verification sub-groups as the properties of the devices change such that the devices either newly meet the requirements or no longer meet the requirements of the various verification sub-groups. When a device's properties change (e.g., a profile that includes a specific cryptographic secret is installed on the device, a user changes the device passcode length, etc.) such that the device becomes eligible for a verification sub-group, the device generates and sends a request for membership in the verification sub-group, as described above. On the other hand, when the device's properties change such that the device no longer meets the requirements for membership in a verification sub-group of which the device is currently a member, the device detects that it should no longer be a member of the sub-group, and transmits this notification to the other devices that are members of the sub-group.

In some embodiments, the verification sub-groups are used to organize the devices into synchronization sub-groups, in order to determine which data items stored on a device should be synchronized with other devices. Synchronization sub-groups, in some embodiments, are defined by (i) a set of requirements for a device to participate in the synchronization sub-group and (ii) a type of data item synchronized between devices that participate in the synchronization sub-group. The set of requirements for synchronization sub-groups, in some embodiments, is membership in one or more verification sub-groups. For instance, the requirements for participation in a first synchronization sub-group might be membership in a first verification sub-group, while the requirements for participation in a second synchronization sub-group might be membership in both second and third verification sub-groups.

The synchronization sub-groups are used to enable the set of related devices to synchronize data items with each other. In various embodiments, these synchronized data items include some or all of usernames and passwords for online accounts (e.g., financial services websites, online forum sites, media content providers, online retail sites, etc.), cryptographic keys and/or secrets (i.e., data from which keys can be generated), network (e.g., Wi-Fi network) passwords, notes, photos, documents and other files, etc. When one of the devices receives a new data item to add to the set of synchronization data items (e.g., from user input of a new password, import or download of a new photo, etc.), the device of some embodiments dynamically tags the data as belonging to one or more synchronization sub-groups. For instance, data might be tagged based on the application within which the data was created (e.g., Wi-Fi networks/passwords vs. online account usernames/passwords), the type of website to which a username/account gains access (e.g., financial website vs. non-financial website), whether data relates to an enterprise or not, etc.

Data items that belong to a particular synchronization sub-group are synchronized between the devices that participate in the particular synchronization sub-group. In some embodiments, each pair of devices creates a secure channel (e.g., using Off-the-Record (OTR) messaging protocol) between themselves to use to send the data items. This secure channel, in different embodiments, may pass through a centralized service (e.g., storage for the cloud service account to which both devices are logged in) that allows for temporary storage even when the receiving device is unlocked. However, the use of the secure channel protects these communications against man-in-the-middle attacks, in some embodiments. Other embodiments use direct peer-to-peer connections (e.g., via a Bluetooth connection).

When a first device determines that it should synchronize its data items to a second device, the first device identifies the synchronization sub-groups in which both the first and second devices participate. For each such sub-group, then first device identifies all of the synchronization data items that it stores that (i) have not already been transferred to the second device and (ii) belong to the synchronization sub-groups in which the second device participates. So long as the synchronization sub-groups do not impose any additional requirements for the secure channel, the first device transfers the identified synchronization data items to the second device via the secure channel. When a synchronization sub-group imposes additional requirements on a secure channel (e.g., encrypting the data items with a cryptographic key required for membership in a verification sub-group), the first device may use multiple different secure channels to synchronize the set of data items with the second device. The second device performs a similar set of operations to synchronize its data items to the first device as well.

As the devices dynamically join and leave verification sub-groups, this may result in the devices joining and leaving the synchronization sub-groups. For instance, if a particular synchronization sub-group requires that a device be a member of first and second verification sub-groups, then if a device loses its membership in the first verification sub-group, the device will no longer be able to participate in the particular synchronization sub-group, even if retaining membership in the second verification sub-group. In some embodiments, when a device is no longer eligible to participate in a particular synchronization sub-group, the device removes all of the data items that belong to that particular synchronization sub-group (or prompts the user to decide whether the device should remove these data items), with the exception of data items that also belong to other synchronization sub-groups in which the device still participates.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description further describe the embodiments described in the Summary as well as other embodiments. Accordingly, to understand all the embodiments described by this document, a full review of the Summary, the Detailed Description, and the Drawings is needed. Moreover, the claimed subject matters are not to be limited by the illustrative details in the Summary, the Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
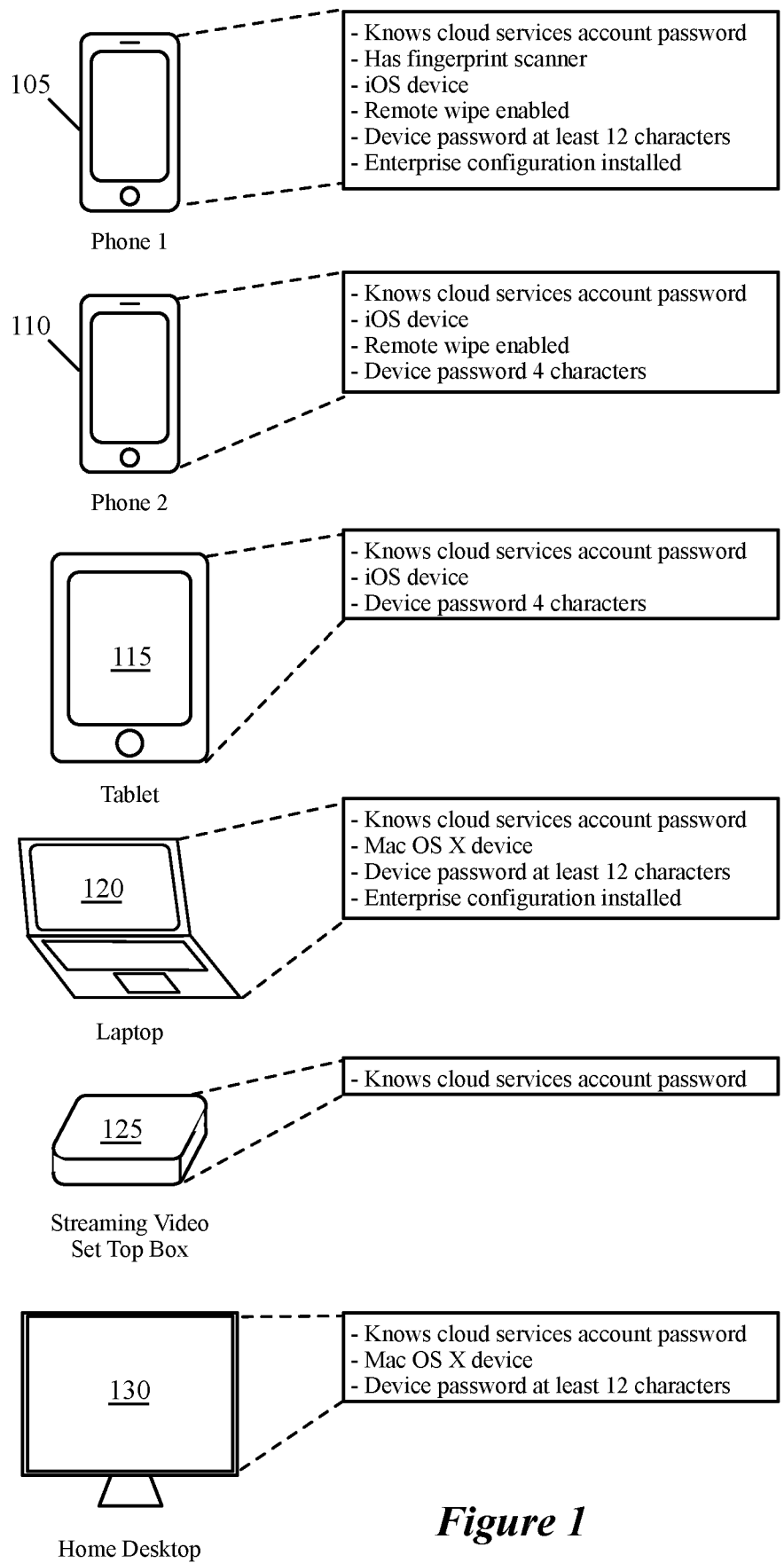
FIG. 1 illustrates an example of six electronic devices that a single user might own.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for synchronizing data items between a set of related electronic devices. Specifically, some embodiments define verification sub-groups that devices may join if the devices satisfy membership requirements for the verification sub-groups, and use the verification sub-groups to define synchronization sub-groups in which the devices participate. Different synchronization sub-groups, in some embodiments, define different types of data items that the devices participating in the synchronization sub-groups share with each other via synchronization processes.

In some embodiments, the set of related electronic devices includes all devices that a user associates with a third-party service (e.g., with a particular cloud services account of the user). Knowledge of the cloud services account password serves as a requirement for membership in at least one of the verification sub-groups (also referred to herein as rings) of some embodiments, while some embodiments define additional rings that the various devices may join. In some cases, a user might own or use multiple smart phones, smart watches, tablets, laptop computers, desktop computers, media players, etc., all of which are logged into the user's cloud service account and have different properties.

Different embodiments define different sets of requirements for joining such additional rings, including requirements that a device have a particular operating system, have a particular level of password strength, have particular hardware (e.g., a secure processing unit such as the Apple Secure Enclave Processor), or other device configuration properties. Some embodiments require that a device prove possession of a particular cryptographic secret in order to join a particular ring (e.g., possession of a key provided with an enterprise profile in order to join a ring defined by the enterprise), or that a user verify the membership of a new device on a device already established in the ring. In addition, some rings may require that a new device verify a property of itself to an established device via an out-of-band process (e.g., by using a third party for verification), with the ring serving as a persistent proof of the property at the particular time that the device joined the ring.

For a device to join a ring, some embodiments require the device to sign a request to join the ring and have the request approved by one of the devices already in the ring. For example, in some embodiments when a device meets the requirements for a ring that requires possession of a cryptographic secret, the device (i) signs its public key (which has already been shared with the other devices) and a date/time of application to the ring with a private key generated from the cryptographic secret, (ii) packages this signature with its identity used for joining the ring, and (iii) signs the identity with its own private key. This signature is then sent to the other devices in the ring as a request to join the ring. When one of the other devices verifies that the requesting device does meet all of the requirements for joining the ring, the established device notifies the other devices in the ring, including the new device being added. In some embodiments, this notification includes a list of the members of the ring, which now includes the new device.

Devices may be members of multiple rings in some embodiments. In addition, devices may dynamically move in and out of such rings as the properties of the devices change such that the devices either newly meet the requirements or no longer meet the requirements of the various rings. When a device's properties change (e.g., a profile that includes a specific cryptographic secret is installed on the device, a user changes the device passcode length, etc.) such that the device becomes eligible for a ring, the device generates and sends a request for membership in the ring, as described above. On the other hand, when the device's properties change such that the device no longer meets the requirements for membership in a ring of which the device is currently a member, the device detects that it should no longer be a member of the ring, and transmits this notification to the other devices that are members of the ring.

In some embodiments, the rings are used to organize the devices into synchronization sub-groups (also referred to herein as views), in order to determine which data items stored on a device should be synchronized with other devices. Views, in some embodiments, are defined by (i) a set of requirements for a device to participate in the view and (ii) a type of data item synchronized between devices that participate in the view. The set of requirements for views, in some embodiments, is membership in one or more rings. For instance, the requirements for participation in a first view might be membership in a first ring, while the requirements for participation in a second view might be membership in both second and third rings.

The views are used to enable the set of related devices to synchronize data items with each other. In various embodiments, these synchronized data items include some or all of usernames and passwords for online accounts (e.g., financial services websites, online forum sites, media content providers, online retail sites, etc.), cryptographic keys and/or secrets (i.e., data from which keys can be generated), network (e.g., Wi-Fi network) passwords, notes, photos, documents and other files, etc. When one of the devices receives a new data item to add to the set of synchronization data items (e.g., from user input of a new password, import or download of a new photo, etc.), the device of some embodiments dynamically tags the data as belonging to one or more views. For instance, data might be tagged based on the application within which the data was created (e.g., Wi-Fi networks/passwords vs. online account usernames/passwords), the type of website to which a username/account gains access (e.g., financial website vs. non-financial website), whether data relates to an enterprise or not, etc.

Data items that belong to a particular view are synchronized between the devices that participate in the particular view. In some embodiments, each pair of devices creates a secure channel (e.g., using Off-the-Record (OTR) messaging protocol) between themselves to use to send the data items. This secure channel, in different embodiments, may pass through a centralized service (e.g., storage for the cloud service account to which both devices are logged in) that allows for temporary storage even when the receiving device is unlocked. However, the use of the secure channel protects these communications against man-in-the-middle attacks, in some embodiments. Other embodiments use direct peer-to-peer connections (e.g., via a Bluetooth connection). The synchronization of data items for a keychain is described in greater detail in U.S. Patent Publication 2014/0281540, which is incorporated herein by reference.

When a first device determines that it should synchronize its data items to a second device (e.g., based on user input, a particular period of time passing, etc.), the first device identifies the views in which both the first and second devices participate. For each such view, then first device identifies all of the synchronization data items that it stores that (i) have not already been transferred to the second device and (ii) belong to the views in which the second device participates. So long as the views do not impose any additional requirements for the secure channel, the first device transfers the identified synchronization data items to the second device via the secure channel. When a view imposes additional requirements on a secure channel (e.g., encrypting the data items with a cryptographic key required for membership in a verification sub-group), the first device may use multiple different secure channels to synchronize the set of data items with the second device. The second device performs a similar set of operations to synchronize its data items to the first device as well.

As the devices dynamically join and leave rings, this may result in the devices joining and leaving the views. For instance, if a particular view requires that a device be a member of first and second rings, then if a device loses its membership in the first ring, the device will no longer be able to participate in the particular view, even if retaining membership in the second ring. In some embodiments, when a device is no longer eligible to participate in a particular view, the device removes all of the data items that belong to that particular view (or prompts the user to decide whether the device should remove these data items), with the exception of data items that also belong to other views in which the device still participates.

The above describes examples of the data synchronization system of some embodiments. Several more detailed examples are described below. Section I describes a group of devices, and examples of rings and views that may be defined for the devices. Next, Section II describes the device architecture of some embodiments for enabling rings and views. Section III then describes the ring joining process of some embodiments, while Section IV describes the synchronization of data for different views. Section V then describes dynamically assessing ring status in some embodiments and the consequences on view participation. Finally, Section VI describes an electronic system with which some embodiments of the invention are implemented.

I. Ring and View Examples

As described above, some embodiments define rings for groups of devices that devices may join based on static or dynamic properties of the devices. These rings may be defined, in various embodiments, by manufacturers of the devices, third-party developers, or the users themselves. For instance, a manufacturer that sells various different types of user devices, any number of which a single user might own, might integrate the ring definitions into the device operating systems. Third-party developers or users, on the other hand, might come up with additional rings that they find useful and design these for some or all of the devices. In some embodiments, the manufacturer provides devices with a framework that allows users to arbitrarily define rings for their personal devices, with the framework having the ability to translate arbitrarily-defined rings into functional ring definitions.

Device manufacturers, third party developers, or users may also organize the devices into views based on the ring memberships, as described above. That is, the participation of a device in a particular view may be defined according to whether the device is a member of one or more rings. In some embodiments, views may also be defined by reference to device properties other than ring membership, whereas other embodiments limit views to definitions based on ring memberships. In some embodiments, in addition to defining ring membership criteria, a user has the ability to define both what data is shared for a particular view as well as to which rings a device must belong in order to participate in that particular view (i.e., to synchronize the specified data with other devices).

FIG. 1 illustrates an example of six electronic devices 105-130 that a single user might own. As shown, these six electronic devices include a first smartphone 105, a second smartphone 110, a tablet 115, a laptop computer 120, a streaming video set top box 125, and a desktop computer 130. In this case, the first phone 105 and the laptop 120 are a user's work devices, while the other four devices 110, 115, 125, and 130 are the user's personally-owned devices. Each of these devices has different properties, some of which are shown in the figure.

Specifically, the first smartphone 105 (which may be, e.g., an iPhone 6) (i) knows the user's cloud services account password (because the user has logged into the cloud services account on that device), (ii) has a built-in fingerprint scanner, (iii) runs the iOS operating system, (iv) has a remote wipe feature enabled that allows the user to remotely direct the phone to wipe its memory in case the phone is lost, (v) has a passcode for unlocking the device that is at least 12 characters long, and (vi) has an enterprise configuration installed. Thus, the fingerprint scanner, lengthy unlock passcode, and remote wipe feature all indicate that the device is a secure device. In addition, installation of the enterprise configuration of some embodiments provides the device with a particular cryptographic secret, enabling the generation of a public/private key pair.

The second smartphone 110 (which may be, e.g., an earlier iPhone) (i) knows the user's cloud services account password, (ii) runs the iOS operating system, (iii) has the remote wipe feature enabled, and (iv) has a 4-character passcode for unlocking the device. This smartphone 110, with a shorter passcode and no fingerprint scanner, is less secure than the first smartphone 105, though still fairly secure.

The tablet 115 (e.g., an iPad) (i) knows the user's cloud services account password, (ii) runs the iOS operating system, and (iii) has a 4-character passcode for unlocking the device. The laptop 120 (e.g., a MacBook) (i) knows the user's cloud services account password, (ii) runs the Mac OS X operating system, (iii) has a 12-character passcode for unlocking the device, and (iv) has an enterprise configuration installed. The streaming video set top box 125 (e.g., an Apple TV) only knows the user's cloud services account password. Finally, the home desktop 130 (e.g., an iMac) (i)

knows the user's cloud services account password, (ii) runs the Mac OS X operating system, and (iii) has a 12-character passcode for unlocking.

These properties listed for the various devices 105-130 represent a few examples of ring membership criteria (e.g., whether a user has logged in to a cloud services account, the operating system of the device, passcode strength, other security features, the presence of a cryptographic secret via the enterprise configuration, etc.). One of ordinary skill in the art will recognize that many other criteria may be used to determine membership eligibility for a ring. As will be shown, some of these criteria are not properties of the device. For example, some embodiments use properties of applications operating on the device as ring membership criteria (e.g., whether an application is installed, how the application is set up on the device, etc.). In addition, some embodiments require certain user actions in order to join a ring, such as the user approving the device on another device already established in the ring, the user entering on the requesting device a code provided by an established device, etc. In addition, some ring membership criteria require third-party verification. For instance, some embodiments require third party proof that a device is a valid iOS device. On the other hand, some ring membership criteria must be simply asserted by the device requesting membership (e.g., that a device passcode is at least a certain length).

Figure 2:
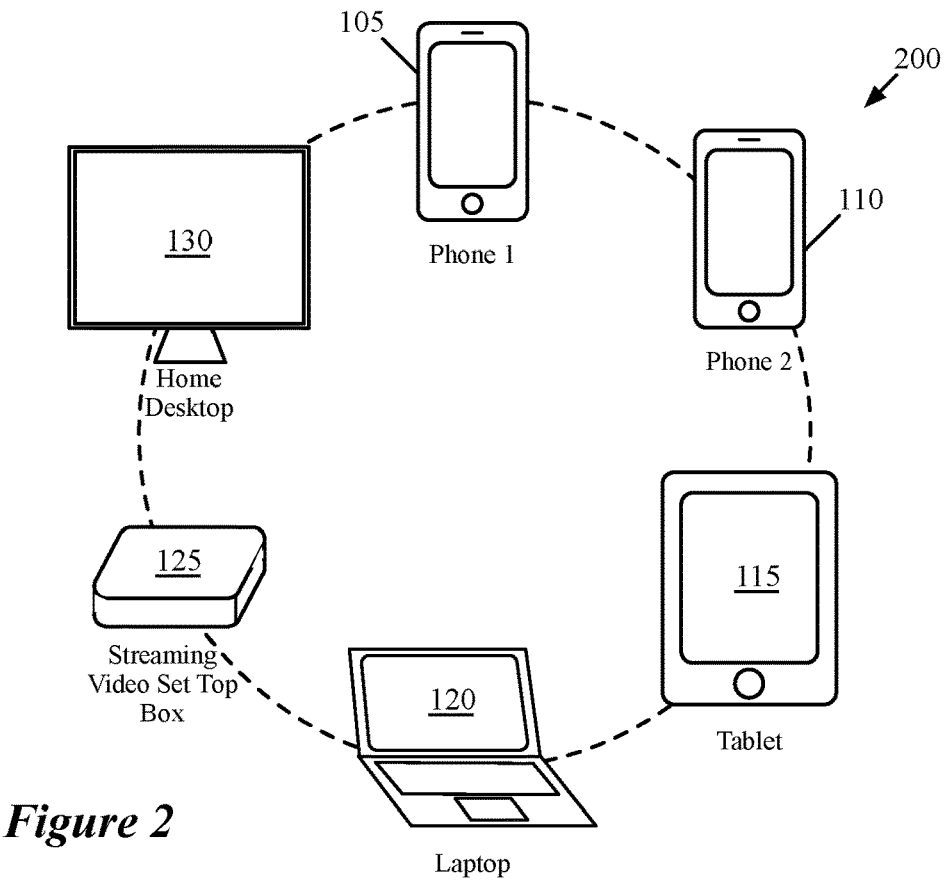
FIG. 2 illustrates a first ring with only a single criteria, that the device knows the user's cloud services account passwords.

FIGS. 2-6 provide examples of various rings of some embodiments for the devices 105-130. FIG. 2 illustrates a first ring 200 with only a single criteria, that the device knows the user's cloud services account passwords. Some embodiments use this ring to allow all of the devices a user owns to join a ring together, so long as the user logs that device onto the cloud services account. In some embodiments, new devices can apply to the ring by using a deterministic public/private key generation algorithm to generate a private key based on the account password, and sign the application for ring membership using this private key (which can be verified by any device already in the ring). As such, all of the devices 105-130 are members of the first ring 200.

Figure 3:
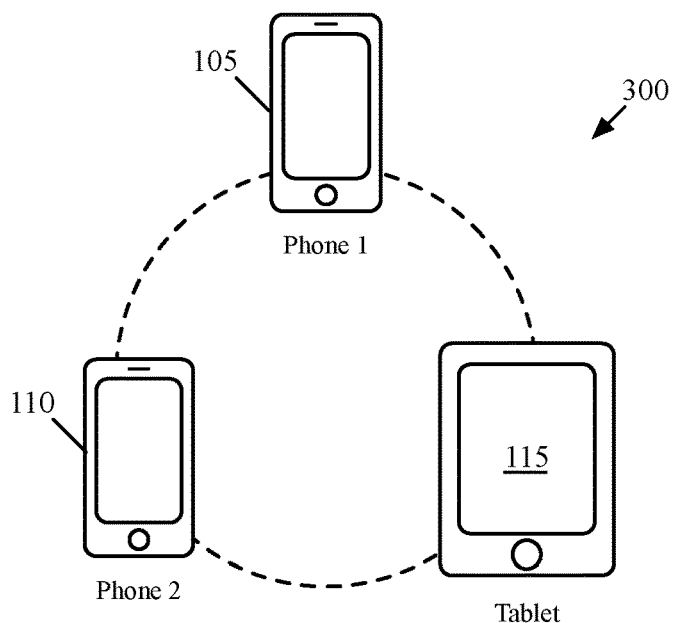
FIG. 3 illustrates a second ring which requires for membership (i) that a device be running the iOS operating system and (ii) that the user approves the device into the ring.

FIG. 3 illustrates a second ring 300 which requires for membership (i) that a device be running the iOS operating system and (ii) that the user approves the device into the ring. Thus, not any iOS device (i.e., a random user's smartphone) can join the ring; instead, a user of an established device must approve the joining of the device into the ring. While the user approval provides an example of a security mechanism to prevent non-user devices from joining, some embodiments require knowledge of the cloud services account password (or another cryptographic secret) for all rings, to prevent the user from accidentally allowing a device of another user into a ring with her actual devices. In some embodiments, a device asserts as part of the ring joining procedure that it is an iOS device; the user is then presented with a prompt to approve not just that the device belongs to the user, but also that the device is an iOS as it claims in the ring membership application (e.g., a prompt reading "An iPhone wishes to join your iOS Device Ring; Please verify that this is your iPhone", or similar information). In other embodiments, the device is required to use a third-party (e.g., the device manufacturer) to verify that the device is an iOS device as claimed. This verification may be performed out-of-band before the device is approved into the ring. The second ring 300 has three members, namely the two smartphones 105 and 110, and the tablet 115, as the other three devices are not iOS devices.

Figure 4:
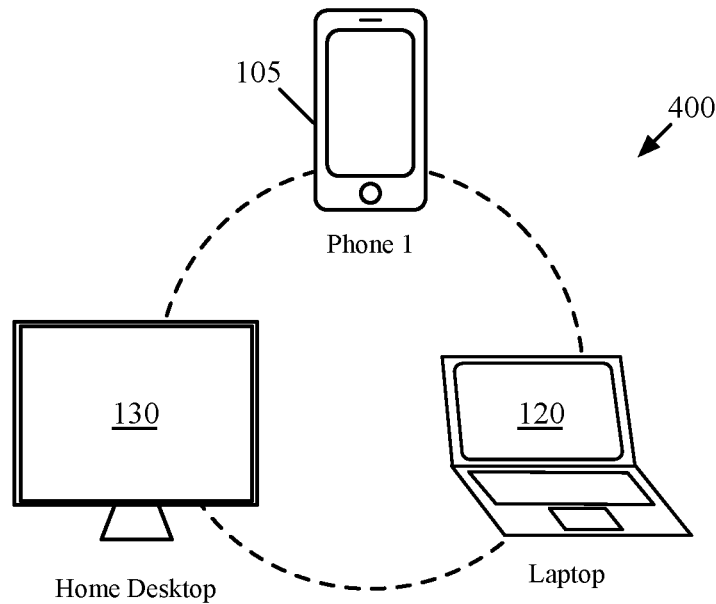
FIG. 4 illustrates a third ring which requires for membership (i) that the device have a passcode/password with at least 12 characters (which serves as a proxy for passcode/password strength) and (ii) that the user approves the device into the ring.

FIG. 4 illustrates a third ring 400 which requires for membership (i) that the device have a passcode/password with at least 12 characters (which serves as a proxy for passcode/password strength) and (ii) that the user approves the device into the ring. As with the previous ring 300, the user approval requirement prevents any random user device from joining the ring as soon as it has a long enough passcode. In addition, as described for the ring 300, in some embodiments a prompt appears on an established device of the user requesting that the user approve a device as having a secure passcode/password. This ring 400 has three members, namely the first smartphone 105, the laptop 120, and the home desktop 130.

Figure 5:
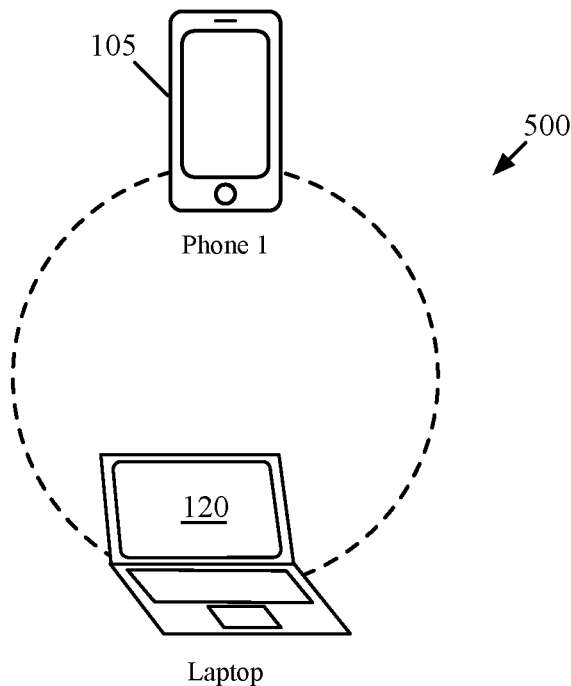
FIG. 5 illustrates a fourth ring which requires for membership that a device (i) have an enterprise profile configuration installed and (ii) knows the cloud services password.

FIG. 5 illustrates a fourth ring 500 which requires for membership that a device (i) have an enterprise profile configuration installed and (ii) knows the cloud services password. In some embodiments, devices can prove possession of the enterprise profile configuration by signing the membership request to join the ring with a private key provided as part of the enterprise profile, a process described in greater detail below by reference to FIG. 13. When a new device requests membership in the ring by sending a signed membership request, one of the established devices verifies this request using the enterprise profile public key. The cloud services password limits the membership to only devices owned by the particular user, rather than any member of the enterprise. This serves as a verification mechanism to ensure that the user approves of the device joining the ring (by having entered the cloud services password). As only two of the user devices have this enterprise profile installed, the ring 500 only includes the smartphone 105 and the laptop 120.

Figure 6:
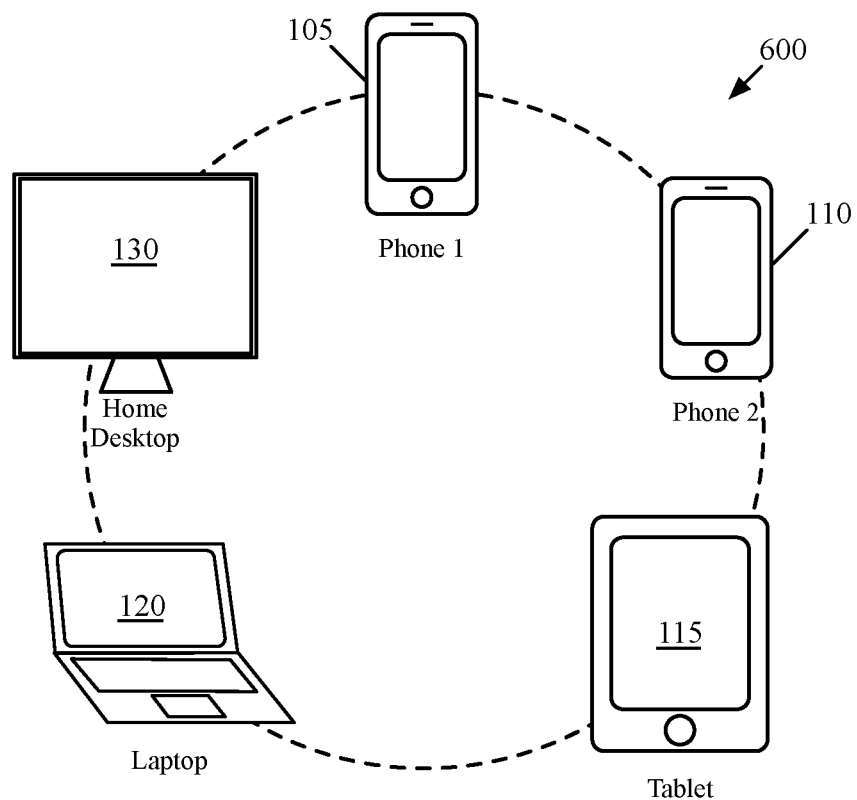
FIG. 6 illustrates a fifth ring which requires for membership (i) that a device has a password and (ii) that the device be verified as an authentic Apple device using an out-of-band process.

Finally, FIG. 6 illustrates a fifth ring 600 which requires for membership (i) that a device has a password and (ii) that the device be verified as an authentic Apple device using an out-of-band process. Some embodiments require various out-of-band proofs for different ring memberships, requiring that a third party certify some aspect that the requesting device asserts in order for an established device to allow the requesting device into a ring. For instance, such third-party verification could be used to prove the validity of a device, the existence of a secure processor on a device, etc., any of which could be ring membership requirements. While the out-of-band verification of a membership criteria only verifies that the membership criteria is true at a particular time, the existence of the ring enables a persistent proof of the asserted criteria without requiring regular third-party verification. For this ring, as all of the devices 105-130 are Apple devices, all of those with a password (smartphones 105 and 110, tablet 115, laptop 120, and desktop 130) are able to join the ring 600.

In the above examples, membership in any of the rings for a requesting device depends in one way or another on the verification of membership criteria by a device that is already established in the ring. Some embodiments enable three different tiers of rings: (1) self-assertion rings, which any device can join simply by asserting membership, (2) application rings, which require a device to assert membership as well as prove knowledge of a cryptographic secret, and (3) concordance rings, which require self-assertion (and in some cases, knowledge of a cryptographic secret) as well as approval of a device already established in the ring.

Self-assertion rings, in some embodiments, generally do not provide a great deal of security and thus are not generally used to develop view requirements (i.e., a device simply asserting a fact about itself does not get that device access to any additional synchronization data). Instead, the assertion of these facts without verification may be part of a device identity that is used within membership requests for application rings and concordance rings. An example of a self-assertion ring would be a ring for which the only membership criteria is that a device assert that it exists, or that it has a passcode, with the device automatically added to the ring as soon as it makes this assertion.

An example of an application ring, in some embodiments, is a ring that requires an enterprise key but no additional verification. Thus, to join the ring, a device must prove that it has the enterprise key (by, e.g., signing an application with the private key). However, no additional level of verification is necessary for such a ring. For instance, the user does not have to approve such a device, and thus any device that possesses the cryptographic secret (and can therefore generate the required key) may join the ring.

Finally, a concordance ring is the type of ring most commonly used to define views (i.e., groups of devices that synchronize specific types of data). As mentioned, a concordance ring requires that a device request membership in the ring and that the application be explicitly verified on a device already established in the ring (e.g., by prompting a user for approval). A concordance ring may also require the proof of a particular cryptographic secret (e.g., a key generated based on a user's cloud service password, an enterprise key, etc.), but once a signature generated from that key is verified by an established device, the established device prompts the user of the device to verify that the requesting device should join the ring.

In addition, some embodiments may use various out-of-band user-interactive techniques to verify that a device should be in a ring (e.g., out-of-band proof of a cryptographic secret). For instance, some embodiments allow the established device to generate a cryptographic secret, and rely on the user to carry this secret to the requesting device in order for the established device to trust the requesting device. As examples, the established device might generate a random number, from which a public/private key pair can be generated. When the user enters this on a requesting device, the requesting device can generate the private key and sign a ring membership request with the generated private key. Similarly, the established device could generate audio or image data (e.g., a Quick Response (QR) Code) and require the requesting device to capture this data, and from the data generate a public/private key pair in a deterministic fashion. One of ordinary skill will recognize that numerous such techniques may be possible, depending on the two types of devices involved (e.g., a smartwatch taking a picture of a QR code generated on a phone, moving one device in a particular manner in the proximity of another device, etc.).

Rings allow devices to verify that other devices have specific properties and persist a proof of those properties such that the devices do not need to regularly verify the properties. Using the rings, some embodiments enable devices to form one or more synchronization sub-groups, or views, that allow devices to share certain data items with devices that have verified certain properties. Thus, participation in each view is defined in some embodiments based on membership in one or more rings; that is, only devices that meet the view requirements (by having been accepted as members in one or more specified rings) can share the synchronized data associated with the view.

Views enable the stratification of different types of data synchronized between a user's devices. As examples, a user might want certain data (e.g., most photos, non-sensitive documents, passwords that do not enable access to financial information or credit card numbers, etc.) to be shared between all of her devices. On the other hand, the user might want other data (e.g., sensitive photos, confidential documents, passwords to financial websites or e-commerce sites that save the user's credit card information) to stay off of less secure devices (e.g., a streaming video set top box not protected by a password). In addition, some data may not have any use on certain types of devices (passwords for mobile applications might not be useful on laptop or desktop devices that do not support such applications).

Figure 7:
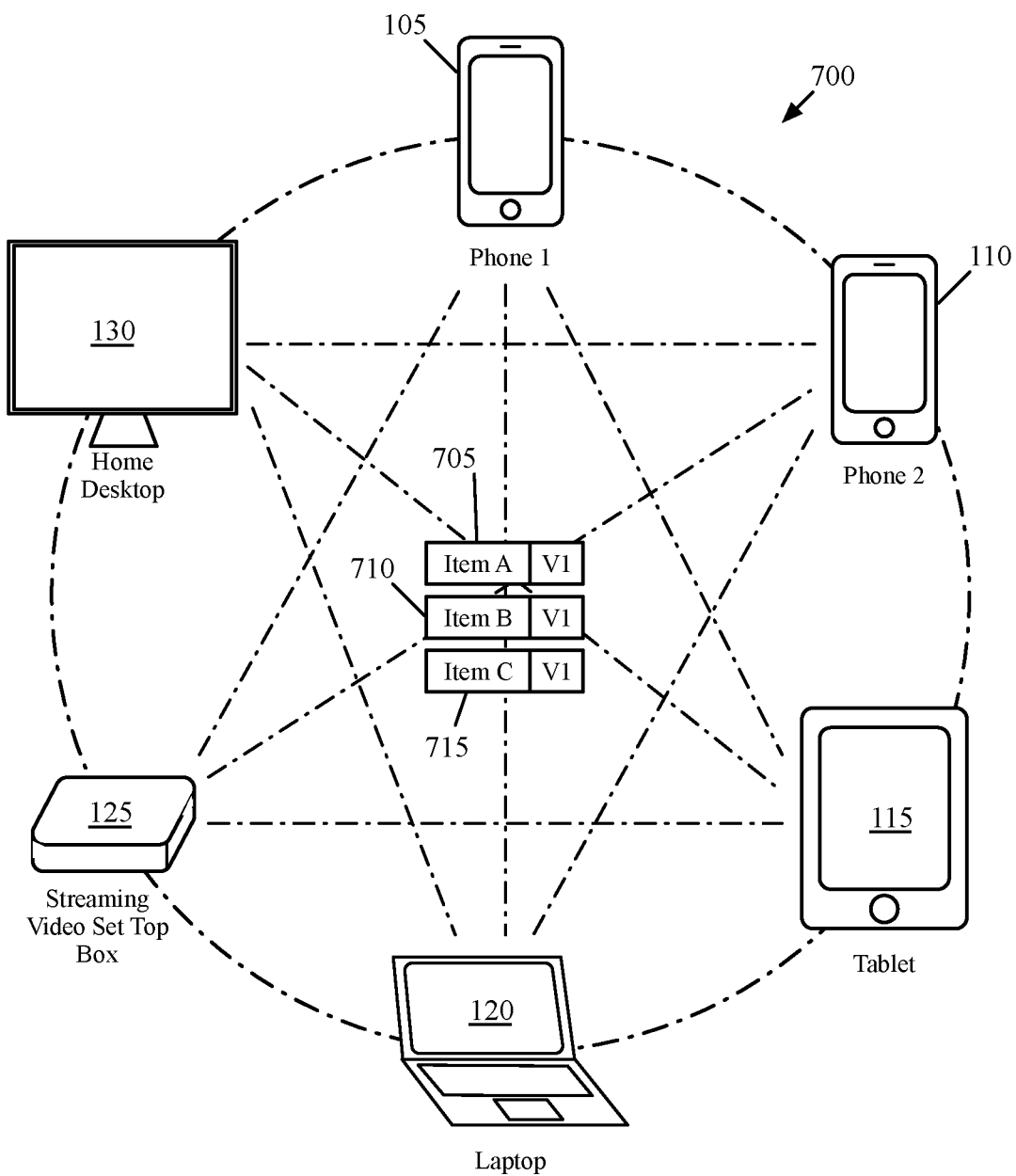
FIGS. 7-9 illustrate examples of different views for the set of devices of FIG. 1, with each view defined based on membership in one or more of the rings of FIGS. 2-6.
Figure 8:
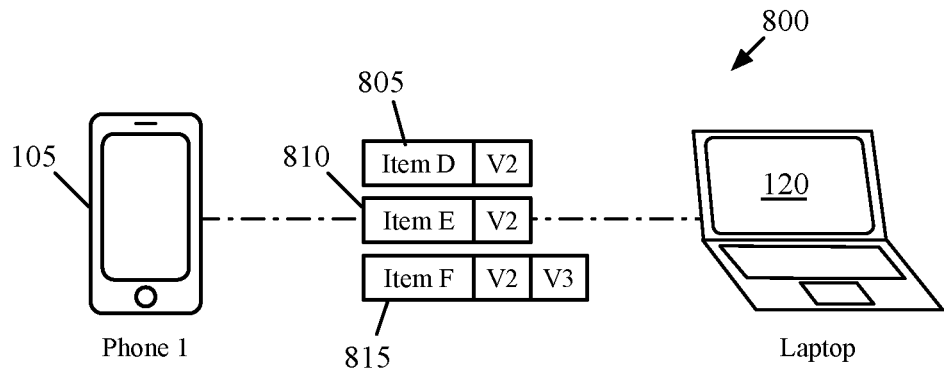
Figure 9:
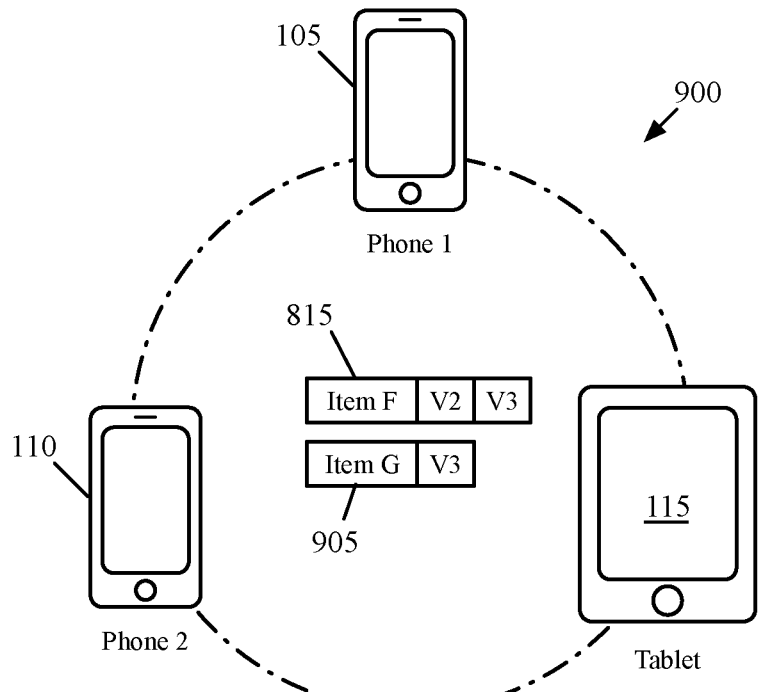

FIGS. 7-9 illustrate examples of different views for the set of devices of FIG. 1. In these figures, each view is defined based on membership in one or more of the rings 200-600. Some embodiments only allow view requirements to be based on ring membership, while other embodiments also allow other types of requirements for a device to participate in a view (e.g., device properties, such as those described above as ring membership requirements). In this sense (defining view requirements based on ring membership), the rings act analogously to a certificate authority, in that they are used to certify certain properties of the devices, which the devices can then use to trust other devices for synchronization purposes.

As shown in FIG. 7, participation in a first view 700 is defined by membership in the first ring 200. As such, all six devices 105-130 participate in the first view. This figure shows that the six devices 105-130 are connected in a full mesh framework, with each of the devices able to synchronize with all other devices. As described in U.S. Patent Publication 2014/0281540, incorporated by reference above, some embodiments use a full mesh connection for synchronization between user devices, whereas other embodiments use other network configurations (e.g., a star network, with one of the devices as a central hub).

This figure indicates that three data items 705-715 belong to the first view 700. In some embodiments, as shown in FIG. 7, each data item stored on a device is tagged with view information that specifies to which view(s) the data item belongs (for each data item that is of a type that the devices synchronize; data items that are not eligible for synchronization will not be tagged as such). When one of the devices receives a new data item to add to the set of synchronization data items (e.g., from user input of a new password, import of a new photo from a camera, creation of a new document, etc.), the device dynamically tags the data as belonging to one or more views. For instance, data might be tagged based on the application within which the data was created (e.g., Wi-Fi networks/passwords vs. online account usernames/passwords), the type of website to which a username/account gains access (e.g., financial website vs. non-financial website), whether data relates to an enterprise or not, etc., depending on how the views for the set of devices are defined.

In some embodiments, the three data items 705-715 are stored on each of the three devices. Once one of the devices receives one of these data items, that device shares the data item with the other devices via separate encrypted channels (i.e., a separate channel between each pair of devices). Thus, if the user first enters a password item 715 on the desktop computer 130, the desktop shares this item with each of the other devices 105-125 via separate channels. These channels, in some embodiments, are encrypted using a password-authenticated key exchange (PAKE), such as off-the-record (OTR) messaging, as described in greater detail below and in U.S. Patent Publication 2014/0281540.

As also described in U.S. Patent Publication 2014/0281540, in some embodiments the point-to-point connections use a cloud services intermediary. That is, for one of the devices (e.g., the smartphone 105) to share data item 705 to a second device (e.g., tablet 115), the sending device sends the data item to an intermediate storage in cloud services (encrypted with the public key of the connection between the two devices). The second device then retrieves the data item from the intermediate storage and decrypts the data item. Using the PAKE enables the devices to share synchronization data items in this way without being susceptible to a man-in-the-middle attack from the owner of the cloud service.

Whereas the first view 700 includes all of the devices, FIG. 8 illustrates a second view that requires membership in both the third ring 400 and fourth ring 500 for participation. This view, essentially, requires that a device be verified as being an enterprise device (i.e., having the enterprise profile installed) and having a highly secure password (at least 12 characters, with length used as a proxy for security). Only two devices, the smartphone 105 and the laptop 120 participate in this view. As shown, the view includes three data items 805-815, each of which is tagged as belonging to this second view (V2). For example, data items might be tagged as belonging to the second view 800 if they relate to certain enterprise applications, or are files the user notates as being work-related. In this case, the addition of membership in the third ring 400 ensures that a user does not change one of their passcodes to a shorter, less secure passcode, as doing so would result in being kicked out of the third ring 400, and thus the view 800. In addition, one of the data items 815 is tagged as belonging to both the second view V2 and a third view V3. In some embodiments, data items may belong to multiple views, and are shared to devices that belong to any one of those views.

Finally, FIG. 9 illustrates a third view 900 that requires membership in both the second ring 300 and the fifth ring 600 (i.e., requiring that the device be an iOS device with a passcode that has been verified as an authentic Apple device). For this third view 900, three devices 105-115 participate, and two data items 815 and 905 are shared between these two devices. The data item 815 is synchronized to the devices 110 and 115, even though these devices do not participate in the second view 800. In other embodiments, that require a device to be a member of each view to which a data item belongs, the smartphone 105 would not be allowed to share they data item 815 with any of the other devices.

Some embodiments allow the customization of this stratification of the synchronization data items, by either third party developers or the user of the devices themselves. For instance, some embodiments provide a toolkit for developers to design rings and/or views for data associated with particular applications. For example, a developer of an enterprise application could design requirements for the devices that would share data items associated with the enterprise application (i.e., could designate a specific password strength or other device requirements). In some embodiments, the devices include a user interface for enabling users to customize how their devices synchronize data. That is, the users could design different views for their data items based on a set of possible requirements, and the devices would implement the user choices through the grouping of rings into views. In other embodiments, however, the design of the rings and views is made by the device manufacturer that designs the set of user devices.

II. Device Architecture

Figure 10:
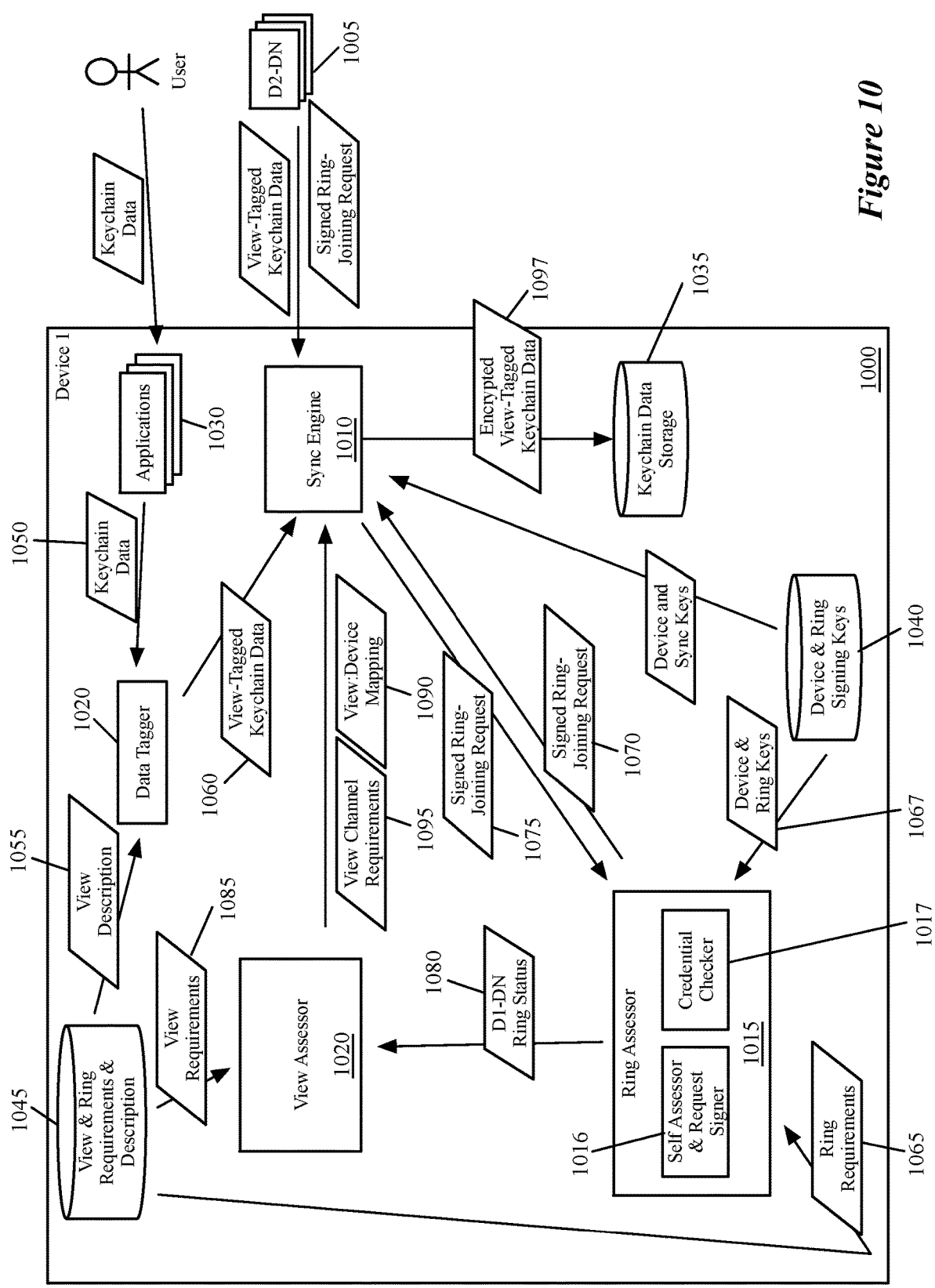
FIG. 10 conceptually illustrates the software architecture of a device 1000 of some embodiments for enabling the grouping of devices into verification sub-groups (rings) and synchronization sub-groups (views).

FIG. 10 conceptually illustrates the software architecture of a device 1000 of some embodiments for enabling the grouping of devices into verification sub-groups (rings) and synchronization sub-groups (views). In this case, the device 1000 is one of several (N) devices associated with a cloud services account. For the discussion in this and subsequent sections, it will be assumed that the various devices joining rings and sharing data items through views are all associated with a single user (e.g., via a cloud services account or other user verification mechanism). Thus, in addition to the device 1000, FIG. 10 illustrates a set of additional devices (D2-DN) 1005. The device 1000, and the other devices 1005, may be any different type of electronic device that is capable of storing data and communicating with a network. For instance, these devices may include smartphones, tablets, laptop and/or desktop computers, smartwatches, set top boxes (either separate from or integrated into a television), virtual devices operating on another device (e.g., virtual machines), etc.

As shown, the device 1000 includes a synchronization engine 1010, a ring assessor 1015, a view assessor 1020, a data tagger 1025, and a set of applications 1030. In addition, the device includes storages for keychain data items 1035, device and ring signing keys 1040, and view and ring requirements and description 1045. These storages may all be part of the same physical storage (e.g., a hard disk, solid state memory, random access memory, etc.) or separate physical storages (for instance, the keys might be stored in a more secure storage than the view and ring requirements/description). In addition, some of the data might be embedded into the code of the modules. For example, if the view description and requirements are fixed, this information might be part of the view assessor and data tagger, rather than separate data pulled from storage by these modules.

The keychain data storage 1035 stores keychain data items, which are the data items synchronized between the device 1000 and the other devices 1005 in some embodiments. These data items, in some embodiments, are stored on the device 1000 encrypted with the public key associated with the device (and are stored on the other devices encrypted with the public keys of those other devices). This public key is a device-specific key generated in a secure fashion by the device when the device is initially formatted, in some embodiments. In addition, in some embodiments, each data item stored on the device is tagged as belonging to one or more views.

The device and ring signing keys storage 1040, in some embodiments, stores various keys that the device uses for data storage, data synchronization, and ring membership joining/verification. For instance, the device key is used by some embodiments to encrypt the data items for storage on the device 1000, and is also used to recover data backed up by one of the devices 1000 or 1005, as described in greater detail in U.S. Provisional Patent Applications 62/168,894 and 62/172,128, as well as the concurrently filed U.S. patent application Ser. No. 14/871,498, entitled "Backup System with Multiple Recovery Keys". These provisional applications and the concurrently filed application are incorporated herein by reference. As described in further detail below, the keys storage 1040 may also store ring signing keys (e.g., a key generated from a shared user credential such as a cloud services account password, enterprise or other keys used to join various different rings) as well as keys for protecting the synchronization data items during transport between devices (i.e., keys for the PAKE-protected channels between device 1000 and each of the devices 1005). In some embodiments, these keys may be stored in various different locations on the device 1000, rather than in a single storage. For instance, some of the keys may be stored in a secure processor, separate from the standard operation of the device 1000.

The view and ring requirements and description storage 1045 conceptually stores the requirements for different rings, as defined by third party developers, the device manufacturer, or the user. These requirements, as shown in the previous section, may include the possession of various credentials and/or cryptographic keys (e.g., the shared user password or other credential, an enterprise key, etc.), the assertion of various device and/or application properties (e.g., passcode length, operating system, application configuration, etc.), the out-of-band verification of various properties (e.g., operating system, device validity, etc.), or various user actions (e.g., the entering of a code shown on one device on another device, moving one device within the proximity of another device, taking a picture of one device with another device, etc.). The storage 1045 also stores the view requirements, which in some embodiments identify which rings a particular device (i.e., device 1000 or one of the other devices 1005) must be a member of in order to participate in each different view. In addition, the storage 1045 includes the view description, which identifies, for each view, which types of data items belong to the view. This view description may identify data items for a view based on various characteristics, including which application the data item is received from (e.g., passwords from the Wi-Fi application for a first view, passwords from a web browser application for a second view), to which World Wide Web domain a password relates (e.g., passwords from a comprehensive list of financial web domains being assigned to a specific view). In some embodiments, the view description simply specifies data items tagged as belonging to the particular view, and the user selects from a list of views when first entering the data item.

Through the applications 1030, a user of the device 1000 may enter keychain data in some embodiments. The applications 1030 may include third-party applications (e.g., banking applications, game applications, streaming video applications, etc.) as well as applications that are integrated with the device operating system and come from the device manufacturer (e.g., a built-in browser or mail application, Wi-Fi application, etc.). The user enters usernames and passwords, or other keychain data, through these applications 1030. In addition, the applications may receive keychain data in other ways (e.g., by generating a cryptographic key, capturing a photo, etc.). The keychain data 1050 captured by the applications 1030 in some embodiments is sent to the data tagger 1025.

The data tagger 1025 handles tagging the keychain data 1050 received from the applications 1030 (and keychain data items from any other sources when the data items are not already tagged with view information). In some embodiments, as shown, the data tagger 1025 pulls view description information 1055 from the view description and requirements storage 1045, and uses this information to determine to which views each of the keychain data items 1050 belong. In other embodiments, as mentioned, the view description is part of the data tagger code, and does not need to be retrieved from storage.

The data tagger 1025 appends this view information to the keychain data. In some embodiments, the data tagger sends the view-tagged keychain data 1060 to the sync engine 1010 (as shown), which uses an encryption key and function to encrypt the data items and store them in the keychain data storage 1035. In other embodiments, the data tagger uses an encryption function to encrypt the view-tagged keychain data 1060 and stores this data directly to the storage 1035, without involving the sync engine 1010. In either case, some embodiments encrypt the data item but leave the view tags unencrypted, so that the views to which a data item belongs can be identified (e.g., by the sync engine 1010) without decrypting the data.

The ring assessor 1015 (i) generates requests for the device 1000 to join rings and (ii) assesses requests from the other devices 1005 to join rings of which the device 1000 is already a member. To generate requests, the ring assessor 1015 of some embodiments includes a self assessor module 1016. This module uses the ring requirements 1065 to determine when the device 1000 meets the membership criteria for a ring. The ring requirements 1065 may be part of the ring assessor code (e.g., if hard-coded by the device manufacturer) or retrieved from the storage 1045 (e.g., if defined by the user of the device or by third-party developers). In some embodiments, the self-assessor 1016 checks periodically to determine whether the device 1000 has changed in such a way that it meets the requirements for a ring of which it is not yet a member, or no longer meets the requirements for a ring of which it is already a member. In other embodiments, the self-assessor 1016 operates in an event-driven manner. That is, when the a device property (or other criteria that affect ring membership) changes, the self assessor 1016 is notified to determine whether the device's ring status should change.

When the self-assessor 1016 identifies that the device meets the criteria for joining a new ring (other than any request-driven actions, such as a user approving ring membership or carrying a code from one of the devices 1005 to the device 1000 (or vice versa), the ring assessor 1015 generates and signs a ring-joining request 1070, using any keys 1067 required for the ring request (e.g., the device public key used as part of the device identity, the device private key and/or any ring-specific keys used to sign the request). The details of such a request are described below by reference to FIG. 13, which illustrates the generation and sending of a ring joining request. Though not shown in the figure, the ring assessor 1015 may also send notifications to the other devices when the self-assessor 1016 determines that the device should no longer be a member of a particular ring.

The ring assessor 1015 also includes a credential checker module 1017 for verifying ring joining requests 1075 received from the other devices 1005. As with the device 1000, when one of the other devices determines that it meets the criteria for joining a ring, that device generates and sends a ring joining request to the other devices in the ring (each device, in some embodiments, stores a list of devices in each ring, including those of which it is not a member). When the device 1000 receives such a request, the credential checker 1017 verifies whether the requesting device should be allowed into the ring that it is asking to join. This may entail verifying that the request is signed with the appropriate key(s), verifying that any out-of-band criteria have been met or performing the out-of-band checks (e.g., that the requesting device is a valid device, that a code generated on the device 1000 has been properly entered on the requesting device, etc.), that the device has properly asserted its criteria for joining the ring, that the user of the device 1000 has approved the requesting device, etc. When the ring joining request is verified, the ring assessor 1015 sends out a ring status message (not shown) to the other devices 1005 that are in the ring. The ring status message, in some embodiments, is a list of the devices in the ring, including the recently-added device. This serves to notify the requesting device that it has successfully joined the ring, as well as to notify the other devices that the device 1000 has approved the membership of the requesting device (and therefore that they do not need to separately process the membership request). In some embodiments, this notification message is signed with a private key of a ring-specific key pair (e.g., the key that was used to sign the membership request).

The ring assessor 1015 also keeps the view assessor 1020 regularly apprised of the current ring status 1080 of the device 1000 as well as the other devices 1005. In some embodiments, the view assessor 1020 requests this information as needed from the ring assessor 1015 (or from a storage to which the ring assessor stores this information). The view assessor 1020 is responsible for determining which of the devices (including the device 1000 and the other devices 1005) participate in each of the different views defined for the group of devices. Specifically, in some embodiments, the view assessor determines (at any given point in time, based on the current ring membership status of all of the devices) a mapping between views and devices (i.e., for each device, in which views does the device participate; or for each view, which device participate). The view assessor 1020 makes this determination based on the view requirements 1085 which, again, may either be coded in to the view assessor by the device manufacturer or be variable information generated by third-party developers and/or users in various different embodiments.

In addition to defining which rings a device must be a member of in order to participate in a view, the view requirements of some embodiments may specify (for some or all of the views) any requirements for the channel used to synchronize data for the view between devices. As mentioned above, in some embodiments the devices form peer-to-peer encrypted channels using, e.g., a PAKE (which relies on a shared key, to which data items are encrypted during synchronization). In addition, some views require a device to be a member of a ring that itself requires possession of a public/private key pair. Some such views require that the channel between two devices use this key in addition to (or as an alternative to) the shared key for the PAKE. For instance, for an enterprise view that requires membership in an enterprise ring, which requires possession of an enterprise private key, some embodiments use the enterprise private key to encrypt the data items synchronized for that view. Thus, the view assessor 1020 provides to the synchronization engine 1010 (i) a mapping 1090 between views and devices and (ii) requirements 1095 for the synchronization channels for each view.

In some embodiments, the synchronization engine 1010 is responsible for syncing the view-tagged keychain data items with other devices 1005. The sync engine 1010, in some embodiments, determines that it should synchronize data items with another device, and receives from the view assessor 1020 the list 1090 of views in which the particular other device participates, and any special channel requirements for each of the views. In some embodiments, the sync engine 1010 synchronizes only one channel at a time, and so it only requests from the view assessor 1020 the list of views that use a specific channel between the device 1000 and the other device (if there are no special channel requirements, then this will be all of the views in which the other device and the device 1000 both participate). The synchronization engine 1010 retrieves the view-tagged keychain data items 1097 that belong to the correct views from the keychain data storage 1035 and synchronizes these data items to the other device via the secure channel. In some embodiments, this entails removing the encryption on the keychain data items used during storage on the device and re-encrypting the keychain data items with the shared key used for the secure channel.

One of ordinary skill in the art will recognize that the set of modules shown in this figure is a subset of the software architecture of a device, which will contain a wide variety of modules for any number of purposes. In addition, many of the modules shown will themselves include several modules, and various modules that may be reused by several of the illustrated modules are not shown. For instance, encryption and/or decryption functions may used by the sync engine when synchronizing data with the other devices (as shown below by reference to FIGS. 16 and 17) and the ring assessor (for signing ring applications and/or verifying the ring applications of other devices, as shown below in FIG. 13).

III. Joining Rings

For a device to join a ring, some embodiments require the device to sign a request to join the ring and have the request approved by one of the devices already in the ring. For example, in some embodiments when a device meets the requirements for a ring that requires possession of a cryptographic secret, the device (i) signs its public key (which has already been shared with the other devices) and a date/time of application to the ring with a private key generated from the cryptographic secret, (ii) packages this signature with its identity used for joining the ring, and (iii) signs the identity with its own private key. This signature is then sent to the other devices in the ring as a request to join the ring. When one of the other devices verifies that the requesting device does meet all of the requirements for joining the ring, the established device notifies the other devices in the ring, including the new device being added. In some embodiments, this notification includes a list of the members of the ring, which now includes the new device.

Figure 11:
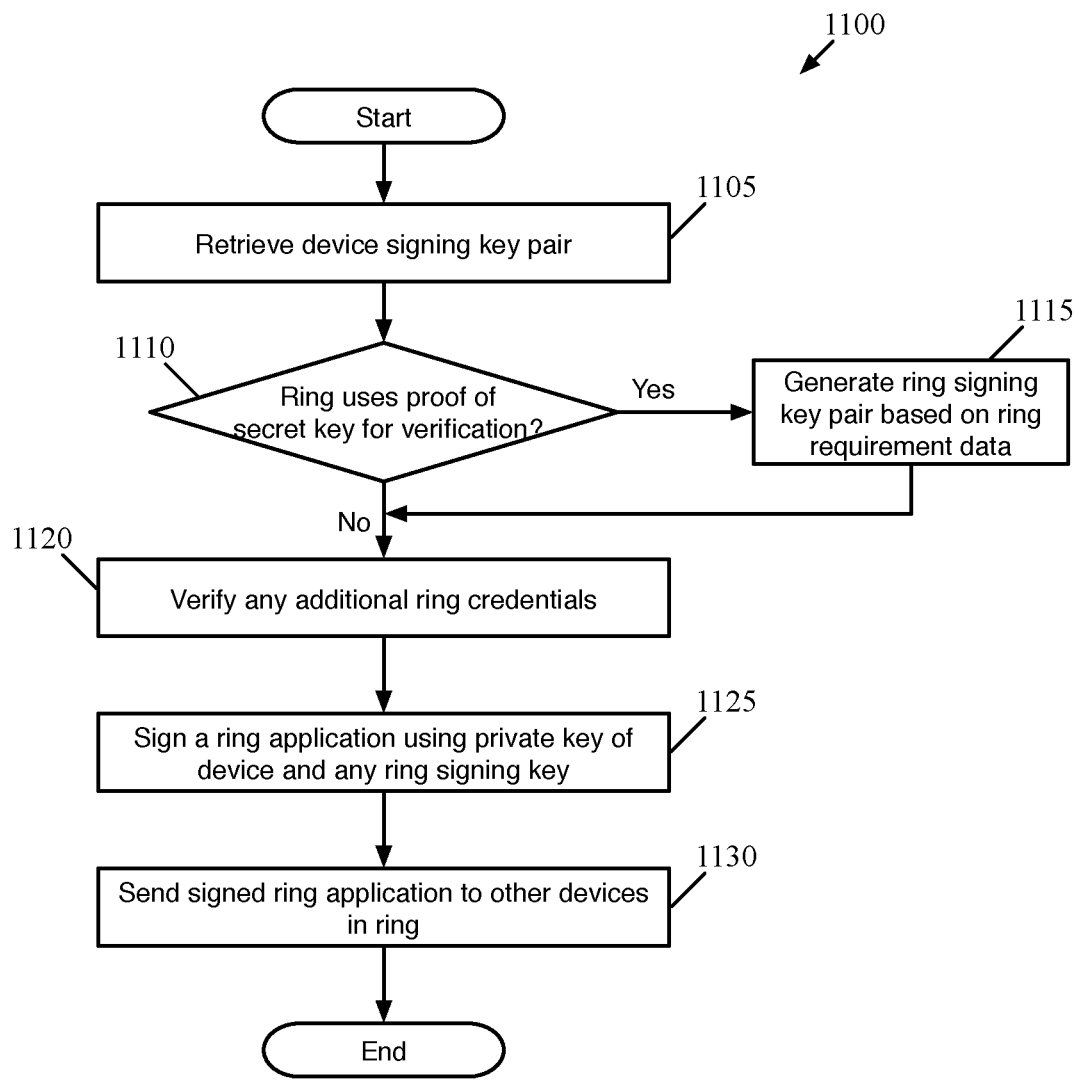
FIG. 11 conceptually illustrates a process 1100 of some embodiments for requesting membership in a ring.

FIG. 11 conceptually illustrates a process 1100 of some embodiments for requesting membership in a ring. In some embodiments, a device (e.g., the ring assessor of a device) performs the process 1100 when the device determines that it meets all of the requirements for joining a ring. When a device property changes (e.g., the user adds a passcode to protect access to the device, a configuration that includes a cryptographic key is installed on the device, the user enters a cloud services account password on the device, etc.) such that the device can now join a ring of which it was not a member, the device performs the process 1100 (or a similar process) in some embodiments.

As shown, the process 1100 begins by retrieving (at 1105) a device signing key pair. In some embodiments, this is a public/private key pair randomly generated by the device (and stored on the device) when the device operating system is initially started and configured by the user of the device. That is, when a user first purchases a device and configures the device for her use (or resets and reconfigures the operating system of the device), the device generates a public/private key pair based on randomized seed data. The seed data for the key pair is not tied to any device hardware in some embodiments, such that if a new key pair is generated for the device (if the user reformats the device), the new key pair will not bear any cryptographic relation to the old key pair. In some embodiments, the device uses the device public key as part of its identity that is shared with the other devices belonging to the user (i.e., the devices with which it joins rings). The device uses its private key to encrypt data items it stores, as well as for backup recovery (as described in the U.S. Provisional Patent Applications 62/168,894 and 62/172,128, as well as the concurrently filed U.S. patent application Ser. No. 14/871,498, entitled "Backup System with Multiple Recovery Keys", which are incorporated by reference above). In addition, the device uses its private key to sign ring membership requests, in some embodiments.

Next, the process 1100 determines (at 1110) whether the ring in which it is requesting membership uses proof of a secret key for verification. That is, some rings require that the device requesting membership indicate that it possesses a specific private key (by, e.g., signing the membership request) for which the established devices have the public key.

When such a key is required, the process generates (at 1115) (or retrieves, if the key is already generated) the ring signing key pair based on ring requirement data. For instance, some embodiments require that the user enter a particular passcode/password in order to join the ring. The device then generates a key pair in a deterministic manner from this password, which is used in the ring membership request. In some embodiments, the seed data from which the key pair is generated is provided to the device as part of configuring the device for a particular purpose. For instance, if the device is owned by an enterprise and used by an employee of the enterprise, the enterprise might install their enterprise-specific configuration on the device, which includes seed data used to generate a public/private key pair, which the device can use to join an enterprise-specific ring. Similarly, an application-specific ring could be joined using cryptographic data available with the application download.

In addition, the process performs (at 1120) any additional ring credential verification. This may involve self-validating specific properties of the device that are required for ring membership, but which do not require outside validation. For instance, some embodiments require the device to assert, but not prove in any cryptographic or out-of-band manner, that it runs a particular operating system, is a particular type of device (in which device type could be a broad category such as smartphone, a particular brand (e.g., Apple, Nokia, HTC, etc.) of smartphone, a particular version (e.g., iPhone 5, iPhone 6, etc.) of device, etc.), has a passcode of at least a particular length, etc.

The additional ring credential verification could also entail out-of-band verification (which, in some embodiments, is performed after the ring membership request is sent, rather than before). The out-of-band verification requires a device to prove, rather than simply assert, a property that is required for membership in a ring. For instance, the device might be required to prove, via a third-party, that it has a valid device from a particular manufacturer, that it runs a particular operating system, that its passcode is at least a particular length, or other properties.

Next, the process signs (at 1125) a ring membership application using the device private key as well as any private ring signing key (i.e., any key generated at operation 1115). This enables the device to prove, via its ring membership application, that (i) it is the device that it claims to be, because only that device has the private key that pairs with its shared public key, and (ii) it possesses the cryptographic secret required for joining the ring. In some embodiments, the ring membership application that is signed also includes other device identification information, including its public key, as well as the time of the application. The signed ring request of some embodiments is described in greater detail below by reference to FIG. 13.

Finally, the process sends (at 1130) the singed ring membership application to the other devices that are already in the ring. In some embodiments, each device associated with a user (e.g., by logging into a user account, by joining a ring that requires a user password, etc.) stores a list of devices that are members of each possible ring, and uses this list to send the ring membership request to the other devices in the ring. So long as one of these devices approves the membership request (e.g., using a process such as that shown in FIG. 12, described below), the device is added to the ring.

Figure 12:
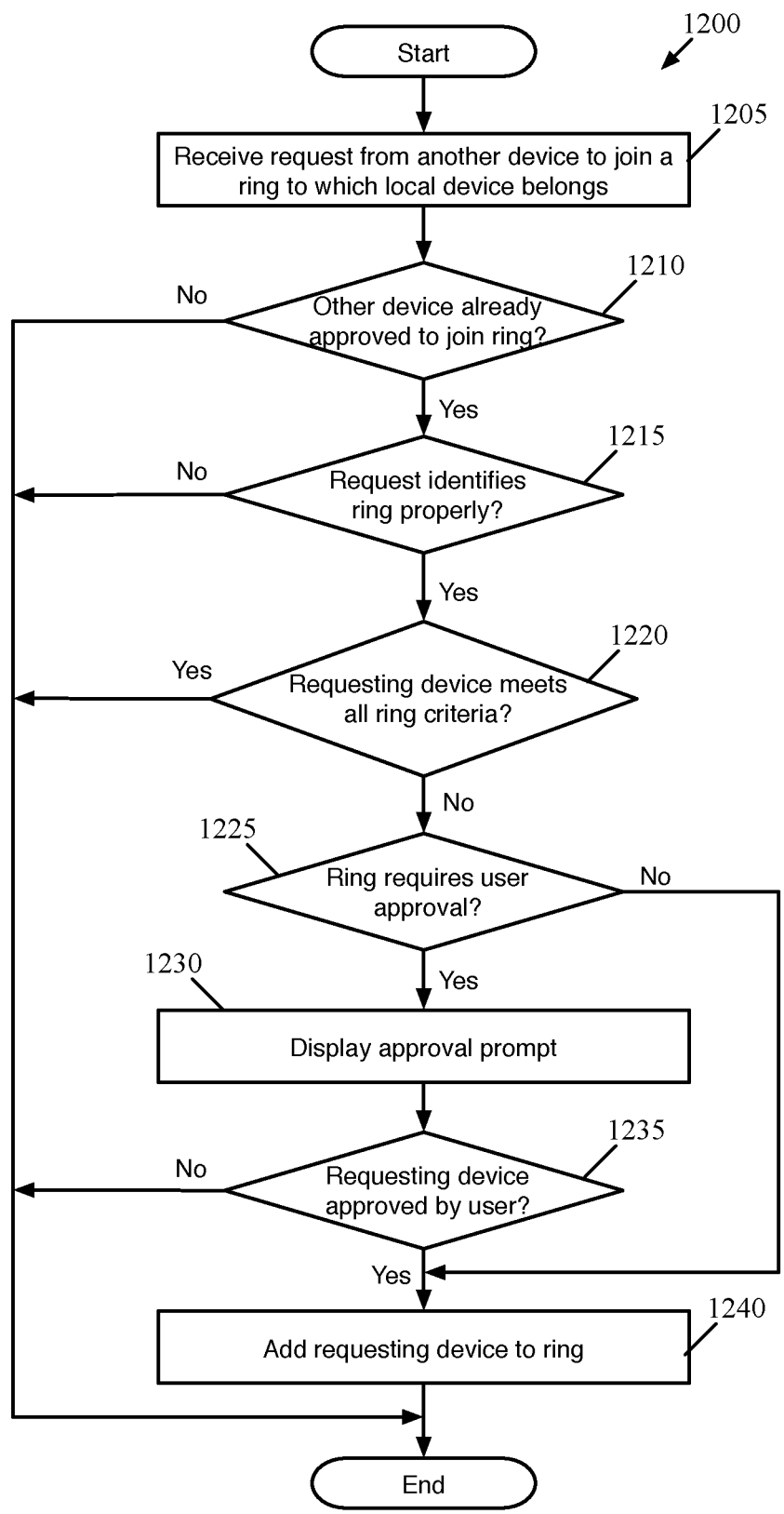
FIG. 12 conceptually illustrates a process 1200 of some embodiments for determining whether to allow a device into a ring.

FIG. 12 conceptually illustrates a process 1200 of some embodiments for determining whether to allow a device into a ring. In some embodiments, a first device performs the process 1100 (or a similar process) to generate a signed request for ring membership, and sends the request to the devices established as members of the ring. One (or more) of these established devices then performs the process 1200 (or a similar process) to either allow the device into the ring (assuming the membership request is proper), or deny the request to join the ring.

As shown, the process 1200 begins by receiving (at 1205) a request from another device to join a ring to which the local device (on which the process 1200 is running) already belongs. In some embodiments, this request is received through a point-to-point connection from the other device that wishes to join the ring. This point-to-point connection may be sent through a direct connection (e.g., a Bluetooth connection between devices, etc.) or through a central repository. For instance, in some embodiments, the requesting device sends messages to several established devices that are stored in a central repository, and each of the established devices retrieves these requests when they are active. That is, a locked or powered-off device may not receive the request until it is unlocked, powered-on, etc.

Upon receiving the request, the process determines (at 1210) whether the request has already been approved by another device. As the requesting device, in some embodiments, sends the membership request to each of the established devices in the ring, in some cases one of the established devices will begin to process the request only to determine that one of the other established devices has already added the requesting device to the ring. In some embodiments, the established device sends out a notification to the other established devices and the new device when the requesting device is added to the ring. In this case, the process 1200 ends.

Assuming that the requesting device has not already been added to the ring, the process 1200 determines (at 1215) whether the request properly identifies the ring. In order to join the ring, some embodiments require that the requesting device generate a request that identifies the members of the ring and/or other aspects of the ring. If the request does not identify the ring properly, then the process ends.

Next, the process determines (at 1220) whether the requesting device meets all of the criteria for membership in the ring. As described, this may include proving possession of a particular cryptographic key by using the key to sign the request, asserting properties of the requesting device (its operating system, type of device, etc.), or validating a requirement of ring membership out-of-band. Thus, the operation of determining whether the requesting device meets all of the criteria may involve initiating an out-of-band process or determining whether the out-of-band process has already been performed to validate the specific criteria of the requesting device. If the requesting device does not meet the criteria, the process ends (and the requesting device is not added to the ring).

Lastly, if the requesting device is otherwise approved for ring membership, the process determines (at 1225) whether the ring requires user approval. This is a specific type of ring criteria, in that it requires user action on the approving device in order for the requesting device to be allowed into the ring. When no user approval is required, the process proceeds to 1240, described below, to add the requesting device to the ring.

When user approval of the requesting device is required for ring membership, the process displays (at 1230) an approval prompt on the local device (the device performing the process 1200). This prompt may simply state that a device is requesting membership to join a ring, or may provide additional context. For instance, the prompt might state a name of the device (e.g., John's iPhone), the type of device, the name of the ring, or other information that would be helpful to the user in assessing whether the request is valid. The process then waits (not shown) for the user to indicate whether to allow the requesting device into the ring.

Once the user responds to the prompt, the process 1200 determines (at 1235) whether the user has approved the requesting device. When the user does not approve the requesting device, the process ends. When the user approves the requesting device, however, the process adds (at 1240) the requesting device to the ring. In some embodiments, the established device (performing the process 1200) adds the requesting device to the ring by sending a message to all members of the ring (including the requesting device) with a list of all the members of the ring. Some embodiments sign this message with the private key of the sending device.

Figure 13:
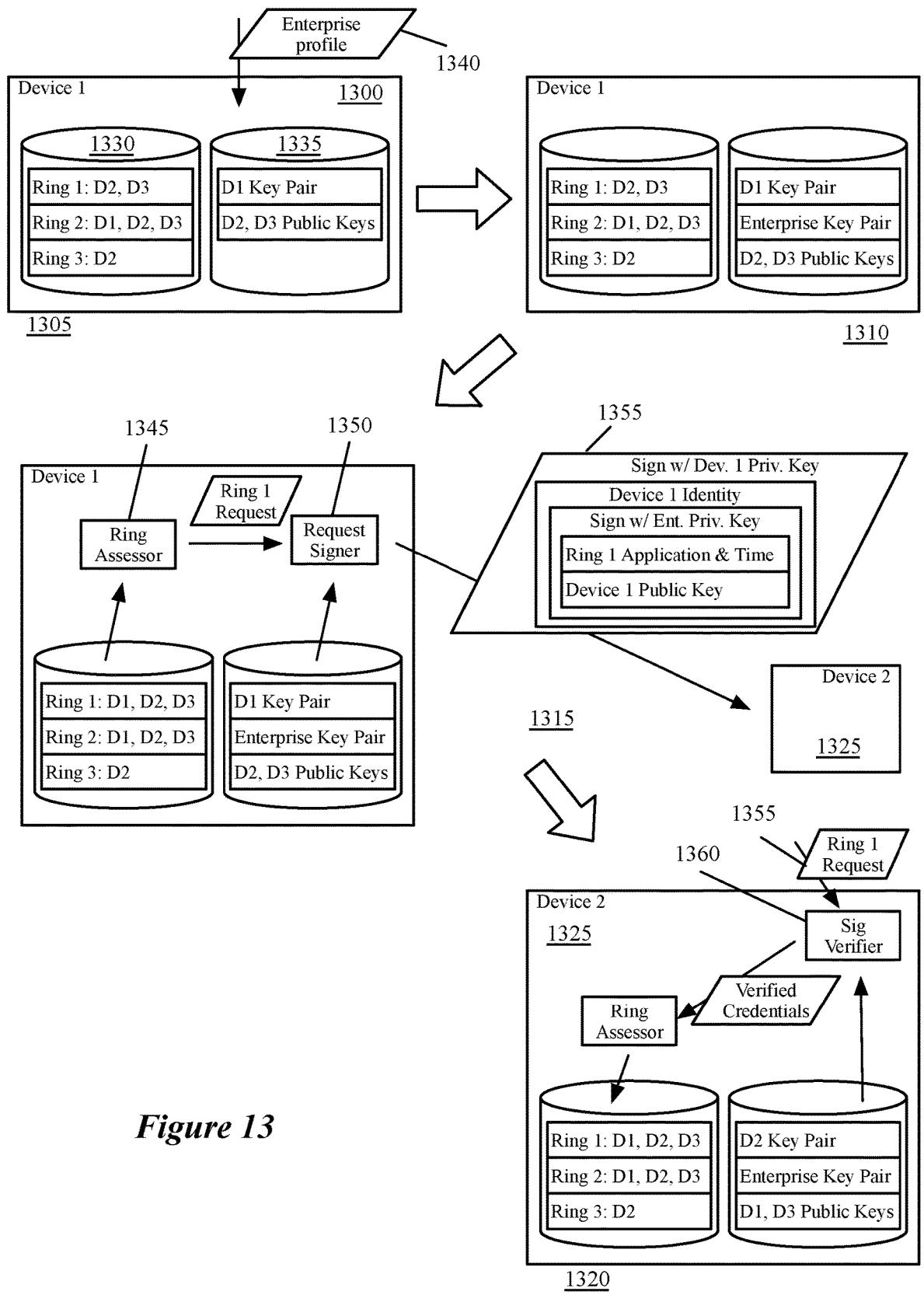
FIG. 13 conceptually illustrates a first device requesting to join a ring and being approved by a second device.

FIG. 13 conceptually illustrates a first device 1300 requesting to join a ring and being approved by a second device 1325, over four stages 1305-1320. The first device 1300 may be any type of electronic device that can join a ring, such as a smartphone, smartwatch, tablet, laptop or desktop computer, etc. For the first device 1300, the figure illustrates that the first device 1300 includes a first storage 1330 that stores information about various rings in which a group of devices (including the first device (D1) 1300) participate. As shown in the first stage 1305, these include a first ring with D2 and D3 as members, a second ring with all three devices as members, and a third ring with D2 as its only member. The first device 1300 also includes a second storage 1335 that stores various keys relating to the other devices and/or the rings. These include the public/private key pair of the device 1300 itself, as well as the public keys for D2 and D3.

At this first stage 1305, an enterprise profile 1340 is installed on the first device 1300. As shown in the second stage 1310, the enterprise profile 1340 includes an enterprise key pair (or seed data from which the enterprise key pair is generated) that is stored in the key storage 1335. The enterprise profile 1340 may also include the installation of applications, various security measures, etc. on the device 1300.

In the third stage 1315, the ring assessor 1345 of the device 1300 determines that the device now possesses the credentials to join the first ring (i.e., the enterprise private key). As such, the ring assessor generates a request, using the request signer 1350. The request signer, in some embodiments, is a cryptographic digital signature generation function, that uses a private key to sign a message or other piece of data. The first device D1 1300 then sends the request 1355 to the second device D2 1325. Though not shown, in some embodiments the first device 1300 also sends the request to D3.

The request 1355, in some embodiments, is generated by the first device 1300 using a process such as that shown in FIG. 11. Specifically, in some embodiments, the device 1300 (i) signs its public key (which has already been shared with the other devices) and a date/time of application to the ring with a private key generated from the cryptographic secret, (ii) packages this signature with its identity used for joining the ring, and (iii) signs the identity with its own private key. As shown, the innermost portion of the request 1355 includes the public key of the device as well as the time that the first device is applying to the ring. This set of data (public key+application time) is then signed with the ring-specific private key (i.e., the enterprise key received by the device 1300 as part of the enterprise profile). The device identity (also referred to as peer info) includes this signature, as well as other data about the device (e.g., its name, a hardware-specific identifier, and/or other data). This device identity is then signed with the private key of the device 1300, thereby certifying that the request is in fact coming from the first device.

In the fourth stage 1320, the second device 1325 receives the request 1355 and verifies the request. The second device 1325 uses a signature verifier 1360 that uses the public key of the first device (shared previously) as well as the enterprise public key (this device is already in the enterprise ring, and thus stores the enterprise key pair. If the signature verifier 1360 verifies that the request is properly signed by the first device, the ring assessor 1365 on the second device 1325 adds the first device 1300 to the first ring. Though not shown in this figure, the second device 1325 sends a message to both D1 and D3 indicating that all three of the devices are members of the first ring. This message, in some embodiments, is signed by the second device 1325.

Figure 14:
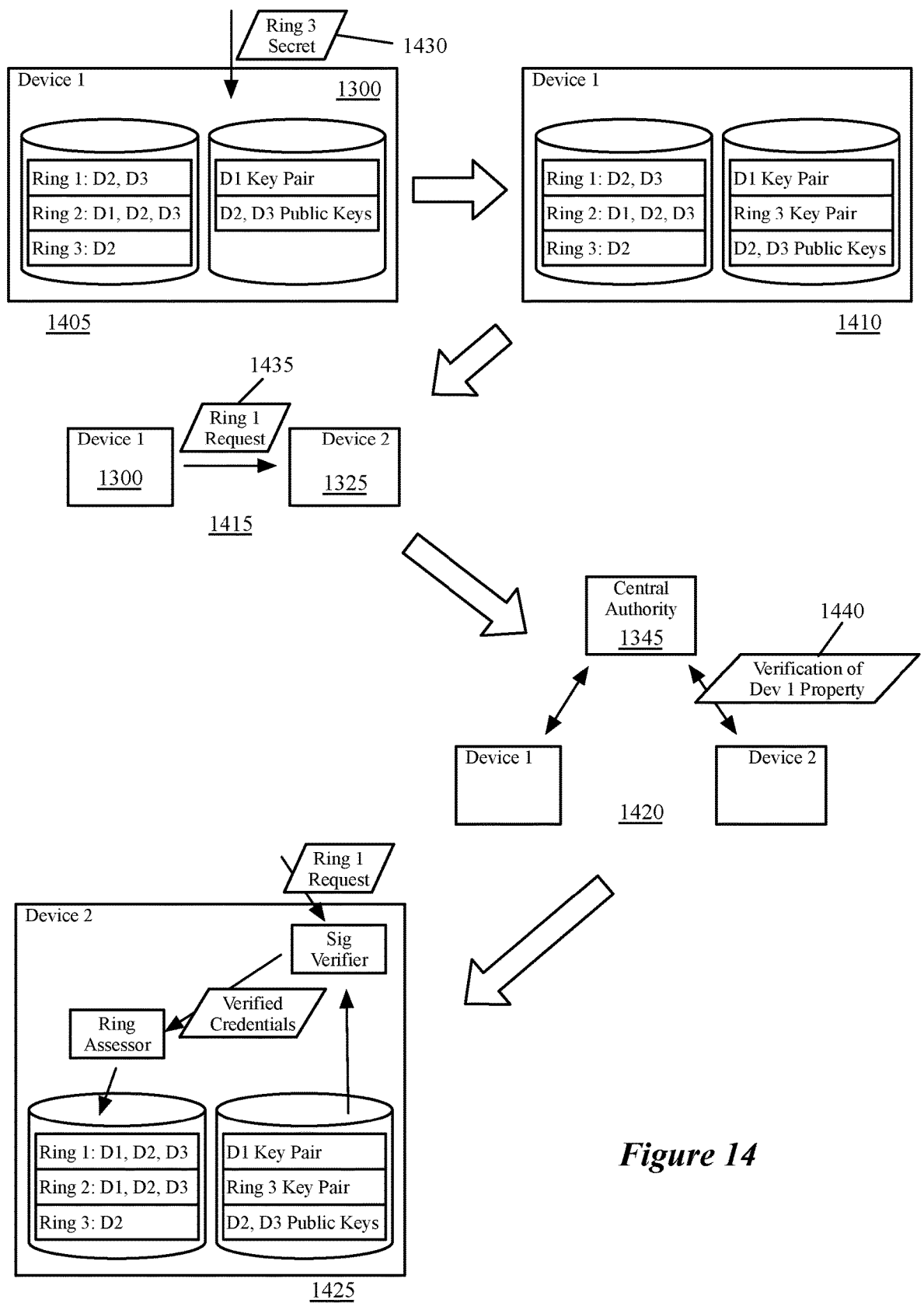
FIG. 14 conceptually illustrates a device joining a ring which requires verification of a device property via a central authority as well as possession of a secret cryptographic key.

The ring joined by the first device in FIG. 13 requires only the signature on the request proving possession of the enterprise ring key. However, as mentioned, in some cases rings may require additional requirements as well. FIG. 14 conceptually illustrates the same device 1300 joining the third ring over five stages 1405-1425, which requires verification of a device property via a central authority as well as possession of a secret cryptographic key. In the first stage 1405, the device 1300 receives (e.g., via user input, download, etc.) a cryptographic secret 1430 for the third ring. As a result, the second stage 1410 illustrates that the key storage on the first device 1300 includes a public/private key pair generated from the cryptographic secret 1430.

In the third stage, the first device 1300 sends a signed request 1435 to join the first ring to the second device 1325. In this case, the first device only sends the request to the second device, as the second device is the only device that is currently a member of the ring. In some embodiments, the request 1435 is signed in the same manner as the request 1355 shown in the previous figure. That is the, request includes the time of application to the first ring along with the public key of the first device, signed with the private key generated from the cryptographic secret 1430. This information is then packaged with the device identity, which is then signed with the private key of the device 1300.

In the fourth stage, prior to accepting the first device into the first ring, the second device 1325 receives verification 1440 of a property of the first device 1300. In this case, the devices use a central authority 1445 to verify the device property via a process which may be initiated by either of the devices. The central authority 1445 could be a manufacturer of the device verifying that the device is authentic or that the device has a particular operating system. As discussed above, the out-of-band processes could involve user actions rather than a central authority, or involve direct exchange of information between the two devices, in various embodiments. Finally, in the fifth stage 1425, the second device 1325 verifies the request and adds the first device 1300 to the first ring, as in the previous figure.

IV. Synchronization Process

With devices established in rings (sub-groups for verification purposes), they can be arranged into views (sub-groups for synchronization purposes. As mentioned, the rings are used to organize the devices into views in some embodiments, which are used to determine which data items stored on a device should be synchronized with other devices. In some embodiments, views are defined by (i) a set of requirements for a device to participate in the view and (ii) a type of data item synchronized between devices that participate in the view. The set of requirements for views, in some embodiments, is membership in one or more rings (as shown above by reference to FIGS. 7-9).

The views are used to enable the set of related devices to synchronize data items with each other. In various embodiments, these synchronized data items include some or all of usernames and passwords for online accounts (e.g., financial services websites, online forum sites, media content providers, online retail sites, etc.), cryptographic keys and/or secrets (i.e., data from which keys can be generated), application-specific service keys that allow access to application-related data stored on a central server, network (e.g., Wi-Fi network) passwords, notes, photos, documents and other files, etc.

Figure 15:
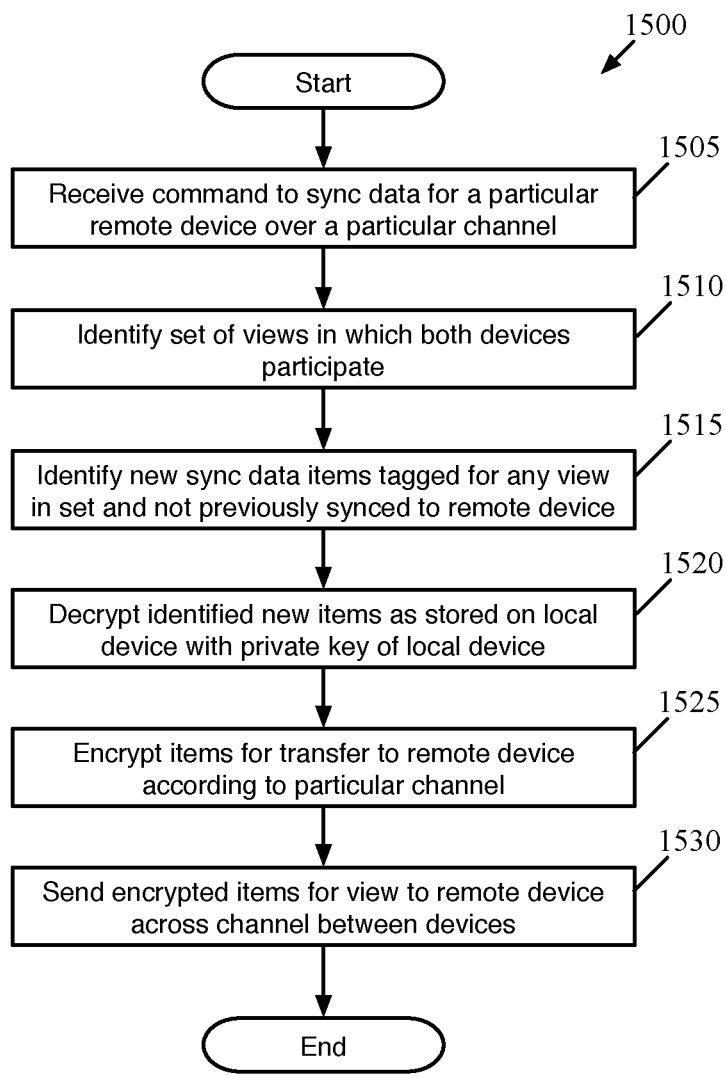
FIG. 15 conceptually illustrates a process 1500 of some embodiments for synchronizing keychain data from a first device to a second device.

FIG. 15 conceptually illustrates a process 1500 of some embodiments for synchronizing keychain data from a first device to a second device. In this case, the process performs the synchronization process for a particular secure channel between the first and second devices, which may be the only secure channel between the devices or one of several secure channels between the devices. While this process performs synchronization for all views over a specific secure channel, other embodiments may use processes that perform (at one time) synchronization for all devices for a particular view, or all views (irrespective of channel) for a particular device.

As shown, the process 1500 begins by receiving (at 1505) a command to sync data for a particular remote device over a particular channel. In some embodiments, the process is performed on a first device that participates in at least one view along with the second remote device. The first device may sync data items periodically with the second device, may sync data items based on user commands, or may sync data items each time the first device receives a new data item and determines (based on the set of views to which the data items belongs) that the data item should be synchronized with the second device.

In some embodiments, each pair of devices in the overall group of devices creates a secure channel (e.g., using Off-the-Record (OTR) messaging protocol) between themselves to use to sync the data items. In some embodiments, so long as the views do not impose any additional requirements for the secure channel, the first device transfers the identified synchronization data items for all of the views in which both devices participate to the second device via the secure channel. When a view imposes additional requirements on a secure channel (e.g., encrypting the data items with a cryptographic key required for membership in a verification sub-group), the first device may use multiple different secure channels to synchronize the set of data items with the second device. In this case, the process 1500 is performed separately for each channel in some embodiments.

The process next identifies (at 1510) the set of views in which both devices (the local device performing the synchronization and the device to which the data is being synchronized) participate. In some embodiments, a view assessor module in the device generates a set of views in which the remote device participates, based on the rings in which the remote device is a member. As discussed above, each device keeps track of the rings of which each other device in the group is a member, so that the data can be used for determining views. Similarly, the device knows which views it participates in, based on its own ring memberships.

The process 1500 identifies (at 1515) new synchronization data items tagged for any view in the identified set (views in which both devices participate) and which have not previously been synchronized to the remote device. The device only synchronizes data that is part of its keychain (i.e., data belonging to views of which it is a member) and which belongs to at least one view in which the remote device participates as well. When the first device receives a new data item to add to the set of synchronization data items (e.g., from user input of a new password, import or download of a new photo, etc.), the device of some embodiments dynamically tags the data as belonging to one or more views. For instance, data might be tagged based on the application within which the data was created (e.g., Wi-Fi networks/passwords vs. online account usernames/passwords), the type of website to which a username/account gains access (e.g., financial website vs. non-financial website), whether data relates to an enterprise or not, etc. When synchronizing the data items with the remote device, the first device identifies all of the synchronization data items that it stores that have not already been transferred to the second device and (and which belong to the views in which the second device participates).

With the data items identified, the process 1500 decrypts (at 1520) these new data items as they are stored on the local device. In some embodiments, the decryption process uses the private key of the local device, a key only known to that device. In some embodiments, the data items are stored on the device in an encrypted form, having been encrypted using the device public key. Some embodiments also encrypt the data items with one or more additional keys for storage on the device, such as the public key of a key pair used to join a ring (e.g., a user password-based key pair, an enterprise key pair, etc.). For each public key used to encrypt the data item for storage on the device, the process uses the corresponding private key to decrypt the data item.

Next, the process encrypts (at 1525) the data items for transfer to the remote device according to the requirements of the secure channel over which the items are being transferred. As mentioned, some embodiments use a password-authenticated key exchange (PAKE), which relies on a shared key used to encrypt messages between the devices. In some cases, the view requirements for a particular view may impose additional limitations on the secure channel for synchronizing data items belonging to the particular view, such as using an additional key (e.g., a key the possession of which is required to join a ring, membership in which is a requirement for the particular view). Thus, some embodiments encrypt the data items with at least the shared key, and possible with additional keys.

Finally, the process sends (at 1530) the encrypted items for the view to the remote device across the secure channel between the devices. This secure channel, in different embodiments, may pass through a centralized service (e.g., storage for the cloud service account to which both devices are logged in) that allows for temporary storage even when the receiving device is unlocked. However, the use of the secure channel protects these communications against man-in-the-middle attacks, in some embodiments. Other embodiments use direct peer-to-peer connections (e.g., via a Bluetooth connection). Upon receiving the encrypted items, in some embodiments the remote device decrypts the items (as encrypted on the channel) and re-encrypts them for local storage using its own public key. In some embodiments, the remote device also performs a similar process to process 1500 to synchronize any of its new data items with the local device.

Figure 16:
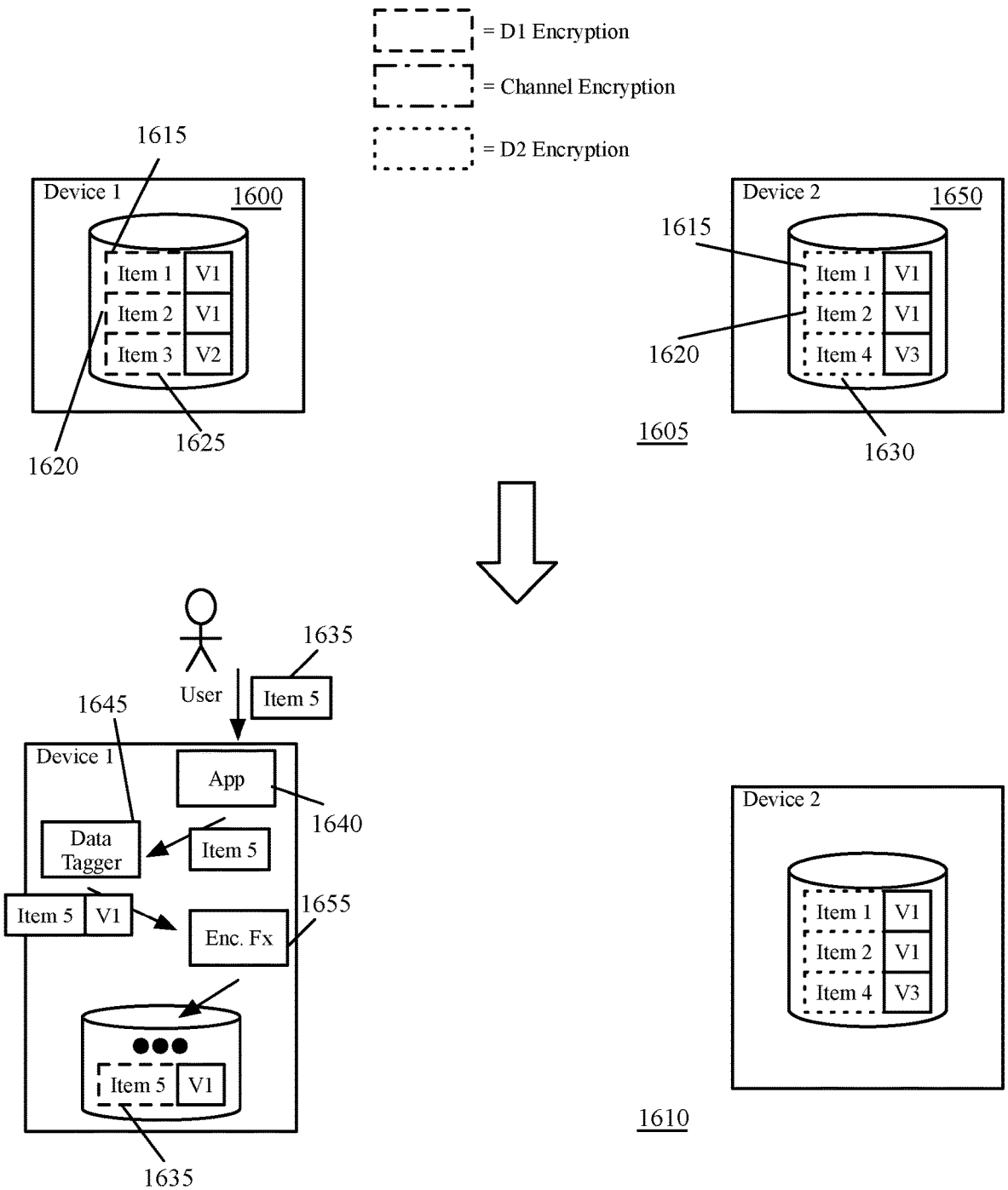
FIG. 16 illustrates the receipt of a new data item for synchronization by a first device.
Figure 17:
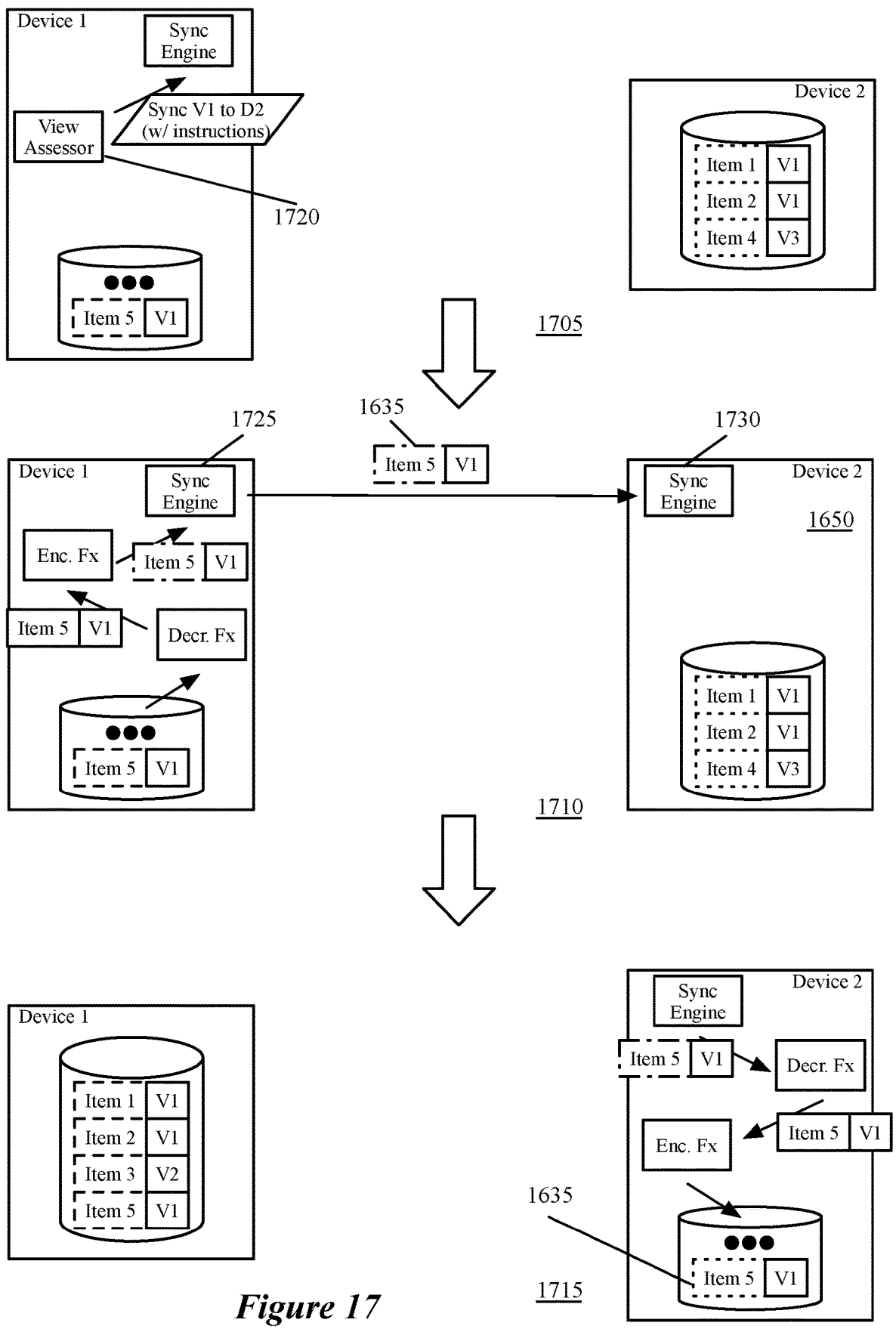
FIG. 17 illustrates the synchronization of the new data item from FIG. 16 from the first device to a second device.

FIGS. 16 and 17 conceptually illustrate a pair of devices 1600 and 1650 that synchronize data with each other. Specifically, FIG. 16 illustrates the receipt of a new data item for synchronization by the first device 1600, over two stages 1605 and 1610. The first stage 1605 illustrates the items stored by each of the two devices 1600 and 1650. In this example, the first device 1600 participates in views V1 and V2, while the second device 1650 participates in views V1 and V3. As shown, the first device stores Item 1 1615, Item 2 1620, and Item 3 1625. The first two items 1615 and 1620 belong to the first view V1 while the third item 1625 belongs to the second view V3, and the data items are tagged as such. The second device stores Item 1 1615, Item 2 1620, and Item 4 1630. The fourth item 1630 belongs to V3, which is why this item is only stored on the second device 1650. Finally, this stage illustrates a legend, which indicates representations used in this and subsequent figures to represent encryption of the data items with different keys. The items stored on the first device 1600 are encrypted with the key of the first device, while the items stored on the second device 1650 are encrypted with the key of the second device.

In the second stage, the user of the first device 1600 (who is also the user of the second device 1650, and thus the devices synchronize data with each other) provides the device with a data Item 5 1635 through an application 1640. This might be a web browser application through which the user enters a password, a third-party application that uses a password, an application through which the user creates a new file (e.g., a document via a word processing application, an image captured through a camera application, etc.), or other application through which the device 1600 receives data.

This fifth data item 1635 is sent to the data tagger 1645 on the first device 1600, which identifies the data item as belonging to the first view V1, and tags the item as such. This might be due to the application 1640 through which the item was received, or other data that identifies the data item (its file type, the web domain with which it is associated, etc.). The item is also sent to an encryption function 1655 (e.g., that performs asymmetric encryption such as RSA, DSS, elliptic curve encryption, etc.). The encryption function 1655 uses the public key of the first device (not shown) to encrypt the data item 1635 for storage. In some embodiments, as shown in this figure, the view information is not encrypted, as this information is not sensitive and decryption should not be required in order for the device to access the view data.

FIG. 17 illustrates the synchronization of the new data item 1635 from the first device 1600 to the second device 1650 over three stages 1705-1715. As shown in the first stage 1705, a view assessor module 1720 on the first device 1600 notifies the synchronization engine 1725 to synchronize data with the second device. The mapping of devices to views indicates that V1 is the only view in which both of the devices participate, and therefore that only data items tagged as belonging to V1 should be synchronized between the devices.

Thus, in the second stage 1710, the first device 1600 sends the new data item 1635 to the second device 1650. As shown by the varying dashed and dotted lines on the representation of the new data item 1635 in the figure, the first device decrypts the stored data item using its own private key (and potentially any other key required), then encrypts the plaintext version of the data item using the shared key for the secure channel between the devices. The sync engine 1725 on the first device 1600 then sends the encrypted data item 1635 across the secure channel, where it is received by the sync engine 1730 on the second device 1650. In some embodiments, as a requirement of the secure channel, the view tag on the data item 1635 is also encrypted using the shared key. As mentioned, though shown as a direct connection between the two devices 1600 and 1650, in some embodiments the data item 1635 is sent by the first device 1600 to a central repository (e.g., cloud storage), and subsequently pulled from the repository by the second device 1650.

The third stage 1715 shows the second device 1650 storing the data item 1635. After receiving the data item, the device 1650 decrypts the item using the shared key of the secure channel (and any other keys necessary, depending on the channel requirements for V1), then encrypts the key for storage using its own public key (and possibly additional encryption keys).

As mentioned, the synchronization data items may include a variety of different types of items in different embodiments, including password/username combinations, Wi-Fi networks and corresponding passwords, cryptographic keys, files, etc. In some embodiments, the data items include application-specific keys that enable access to application-related data stored in a cloud service, via a hierarchy of nested keys. That is, for each application on a device (or each of a subset of the applications on the device), the synchronization data includes an application-specific private key (e.g., a photos application key).

Figure 18:
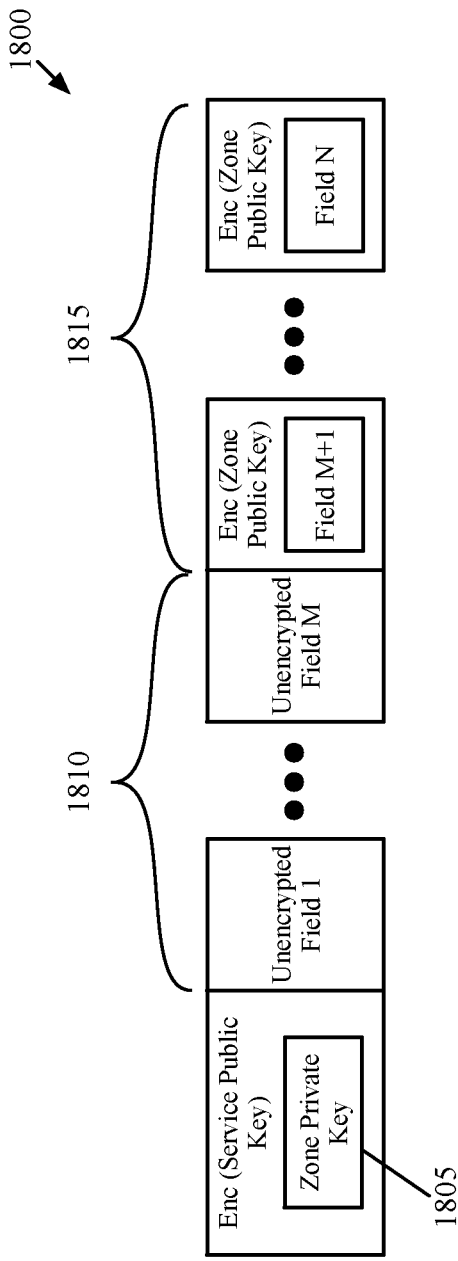
FIGS. 18 and 19 illustrate a data protections structure in which an application-specific private key is used to access data stored in a tree of keys and data fields, which ultimately allows access to the application data itself.
Figure 19:
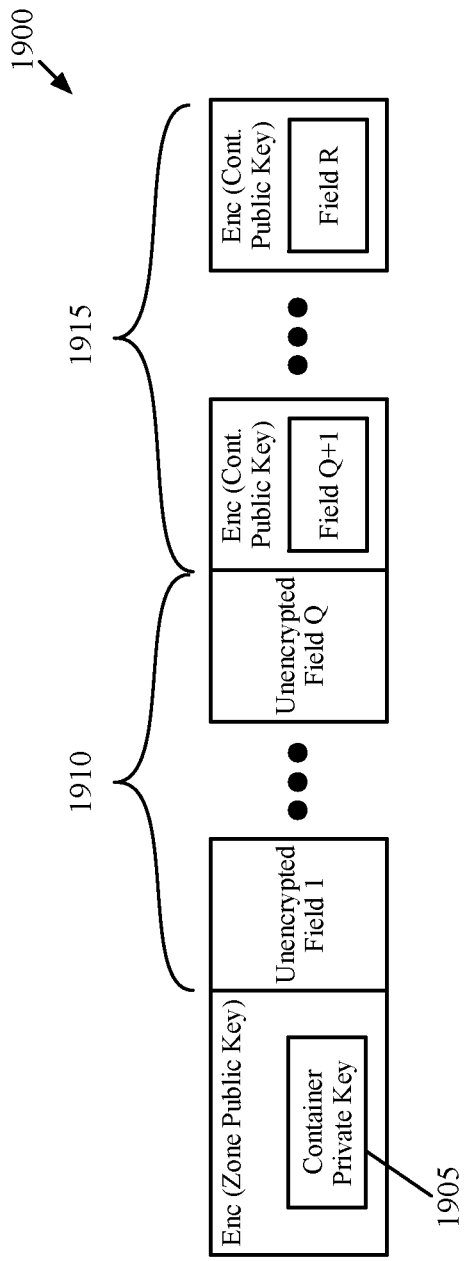

The application-specific private key is used to access data stored in a tree of keys and data fields, which ultimately allows access to the application data itself. This protection structure is shown in FIGS. 18 and 19. FIG. 18 illustrates a container structure 1800 that is stored in a centralized repository (e.g., a cloud storage), and is available for a device to download in some embodiments. The container structure 1800 includes its own private key 1805 (or seed data used to generate the private key) encrypted with the application-specific public key. Thus, access to this container private key requires possession of the application-specific private key that is synchronized as a keychain data item. The container structure 1800, which represents a high-level overview of the application, includes both a set of unencrypted fields 1810 (Field_1-Field_M) which do not require any keys to access, as well as a set of fields 1815 (Field_M+1-Field_N) which are each encrypted with the container public key 1805 (and therefore require possession of the container private key for access).

In addition, the container public key is used to encrypt a zone private key 1905, which is part of a zone structure 1900. Thus, access to the zone structure requires access to the container private key 1805, which in turn requires access to the application-specific service key. As with the container structure 1800, the zone structure 1900 includes several unencrypted fields 1910 (Field_1-Field_Q) and several fields 1915 (Field_Q+1-Field_R) encrypted with the zone key. While the container represents a high-level overview of an application, a zone represents a specific database or table within the container in some embodiments. For instance, a zone could represent a set of photos associated with an application, with each photo represented by a record (and the records pointed to by the zone).

Each of the records referenced by the zone, in some embodiments, could include a key to a specific piece of application data (e.g., a specific photo). Each record, in some embodiments, has a key encrypted with its zone public key, and thus requires the zone private key to access. The record is structured like the container and the zone, with unencrypted fields and encrypted fields. For example, the fields for a photo record could store the title, location, timestamp, etc. for a photo, as well as a key that will actually unlock the photo. In some embodiments, the record key unlocked by the zone key is a symmetric key, rather than the private key of a public/private key pair.

In addition to being shared via the synchronization process, the application-specific keychain data items are recoverable via a secure escrow system in some embodiments, as described in U.S. Provisional Patent Applications 62/168,894 and 62/172,128, as well as the concurrently filed U.S. patent application Ser. No. 14/871,498, entitled "Backup System with Multiple Recovery Keys", and U.S. Patent Publication 2014/0093084, which is incorporated herein by reference.

V. Dynamic Changes to Group Membership

As shown in FIGS. 2-6, devices may be members of multiple rings in some embodiments. In addition, devices may dynamically move in and out of these rings as the properties of the devices change such that the devices either come to meet the requirements or no longer meet the requirements of the various rings. When a device's properties change (e.g., a profile that includes a specific cryptographic secret is installed on the device, a user changes the device passcode length or adds a passcode to a device, etc.) such that the device becomes eligible for a ring, the device generates and sends a request for membership in the ring, as described above. On the other hand, when the device's properties change such that the device no longer meets the requirements for membership in a ring of which the device is currently a member, the device detects that it should no longer be a member of the ring, and transmits this notification to the other devices that are members of the ring.

A device joining or leaving a ring may affect the device's participation in one or more views as well. For instance, when a device joins a ring, that device may now be able to participate in a new view, and therefore should receive (via the synchronization process) the data that belongs with that new view. On the other hand, when the device leaves a ring, the device may no longer be allowed to participate in one or more views that require membership in the particular ring of which the device is no longer a member. This will be recognized by the other devices associated with the particular device, which will no longer share data belonging to these affected views with the particular device. In addition, in some embodiments, the particular device will delete all of the data items to which it is no longer entitled. In other embodiments, the device asks the user before deleting any data, in case the user wants to keep the data on the device even though the device will no longer receive new data for the view.

Figure 20:
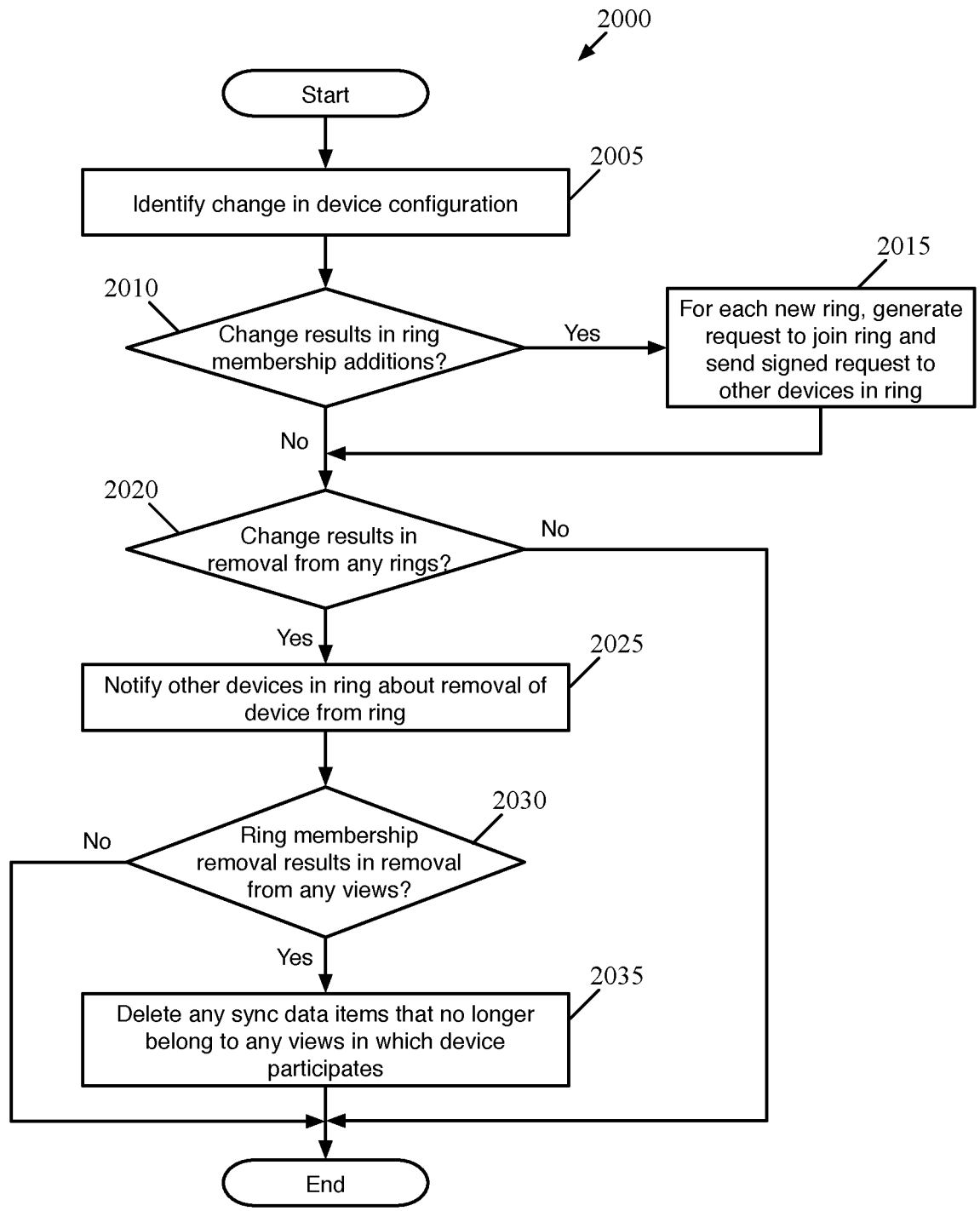
FIG. 20 conceptually illustrates a process of some embodiments for dynamically modifying a device's ring membership and, subsequently, its view participation.

FIG. 20 conceptually illustrates a process 2000 of some embodiments for dynamically modifying a device's ring membership and, subsequently, its view participation. The process 2000 is performed by a device to assess its own ring membership, in some embodiments, and then assess its view participation. As indicated above, the device may be a smartphone, smartwatch, tablet, laptop computer, desktop computer, or any other device that participates in a synchronization system between related devices.

As shown, the process 2000 begins by identifying (at 2005) a change in the device configuration (of the device running the process). This change in device configuration might be the result of a user changing the passcode of the device (e.g., changing from a four-digit passcode to a lengthy passcode or vice versa, removing the use of a passcode on the device, adding a passcode to the device, etc.), installing an application on the device, upgrading the operating system of the device, modifying the application or device settings, learning a new cryptographic secret, etc. Some embodiments regularly check for changes that relate to an enumerated set of ring requirements, while in some embodiments the process 2000 is event driven in that certain changes to the device cause certain operations of the process 2000 to be performed.

The process determines (at 2010) whether the change results in any additions to ring membership. Referring to the rings 200, 300, 400, 500, and 600 in FIGS. 2-6 above, examples of such changes would be if the user changed the passcode on smartphone 110 or table 115 to have at least twelve characters rather than four characters, if the enterprise configuration was installed on either of these devices or the home desktop 130, if a device passcode was added to the streaming video set top box 125, etc. As discussed above, many other types of changes could also result in a device becoming eligible for membership in a ring.

When the change to the device configuration results in eligibility for membership in at least one ring, the process generates (at 2015) a request to join the ring and sends this signed request to the other devices in the ring. In some embodiments, the device performs the process 1100 of FIG. 11 to generate and send a signed ring at 2015. Once the device has successfully joined the ring (assuming the membership request is valid), then if the ring membership results in the device participating in one or more additional views, the process 1500 or a similar process can be performed by one of the other devices to synchronize the data items belonging to those additional views with this device.

The process also determines (at 2020) whether the change results in removal from any rings for the device. Again referring to the rings of FIGS. 2-7, examples of such changes would be the removal of the enterprise configuration from either the smartphone 105 or the laptop 120, removal of the passcode from any of the devices 105-120 or 130, shortening the password on the smartphone 105, laptop 120, or desktop 130, etc. Many other types of changes (e.g., revoking a password or cryptographic key from the device) could also result in a device losing membership eligibility in a ring as well.

If none of the device configuration changes result in removal of the device from any rings, then the process 2000 ends. Otherwise, however, the process notifies (at 2025) other devices in the ring about the removal of the device from the ring. Some embodiments send out a message signed with the private key of the device to indicate this change. In addition to notifying the other devices in the ring, some embodiments also notify any other related devices that are not in that particular ring (e.g., other devices of the same user). For example, if the smartphone 105 was removed from the ring 500 (because the enterprise configuration was removed from the device), then it would notify all of the devices 110-130 in some embodiments.

In addition to determining whether or not the device change affects the ring status of the device, if the device leaves a ring, the process 2000 also handles potential view participation changes for the device. Thus, the process determines (at 2030) whether the ring membership removal results in the removal from any of the views. As participation for any particular view is determined based on membership in one or more rings, removal from one of the rings used to determine view participation will result in the device no longer being eligible to participate in the view. For instance, using the example of the previous paragraph, removal of the smartphone 105 from the ring 500 would subsequently result in the smartphone no longer being eligible to participate in the second view 800.

There is no need to notify the other devices that participate in a view when a device is removed from the view, as the other devices will draw the same conclusion based on the device's removal from one of the required rings. However, in some embodiments, the process 2000 deletes (at 2035) any synchronization data items that no longer belong to any views in which the device participates. As mentioned above, some embodiments do not automatically delete this data, but instead prompt the user to ask whether the data should be deleted (so that the user does not lose any data that they do not want to lose). In some embodiments, whether to prompt the user depends on the view. For instance, if an enterprise view requires a certain level of security, then the enterprise might not want to give the user the option of keeping the data if the device no longer meets the security constraints. However, such a view might give the user the option to reverse the change that resulted in the removal from the view (e.g., reversing a change to a shorter password).

Figure 21A:
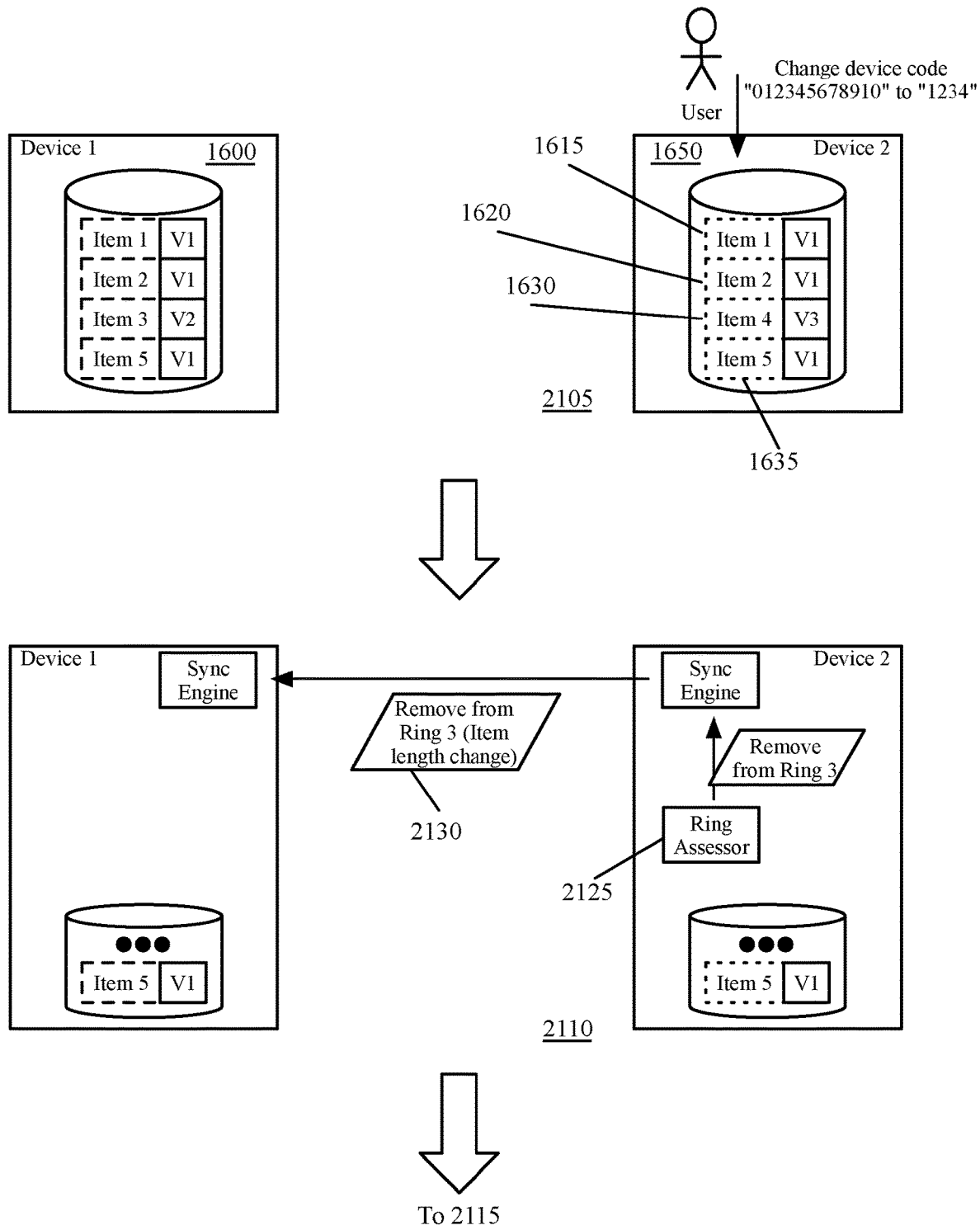
FIGS. 21A-B illustrate the devices from FIGS. 16 and 17 when one of the devices has its password changed such that it is removed from a ring.
Figure 21B:
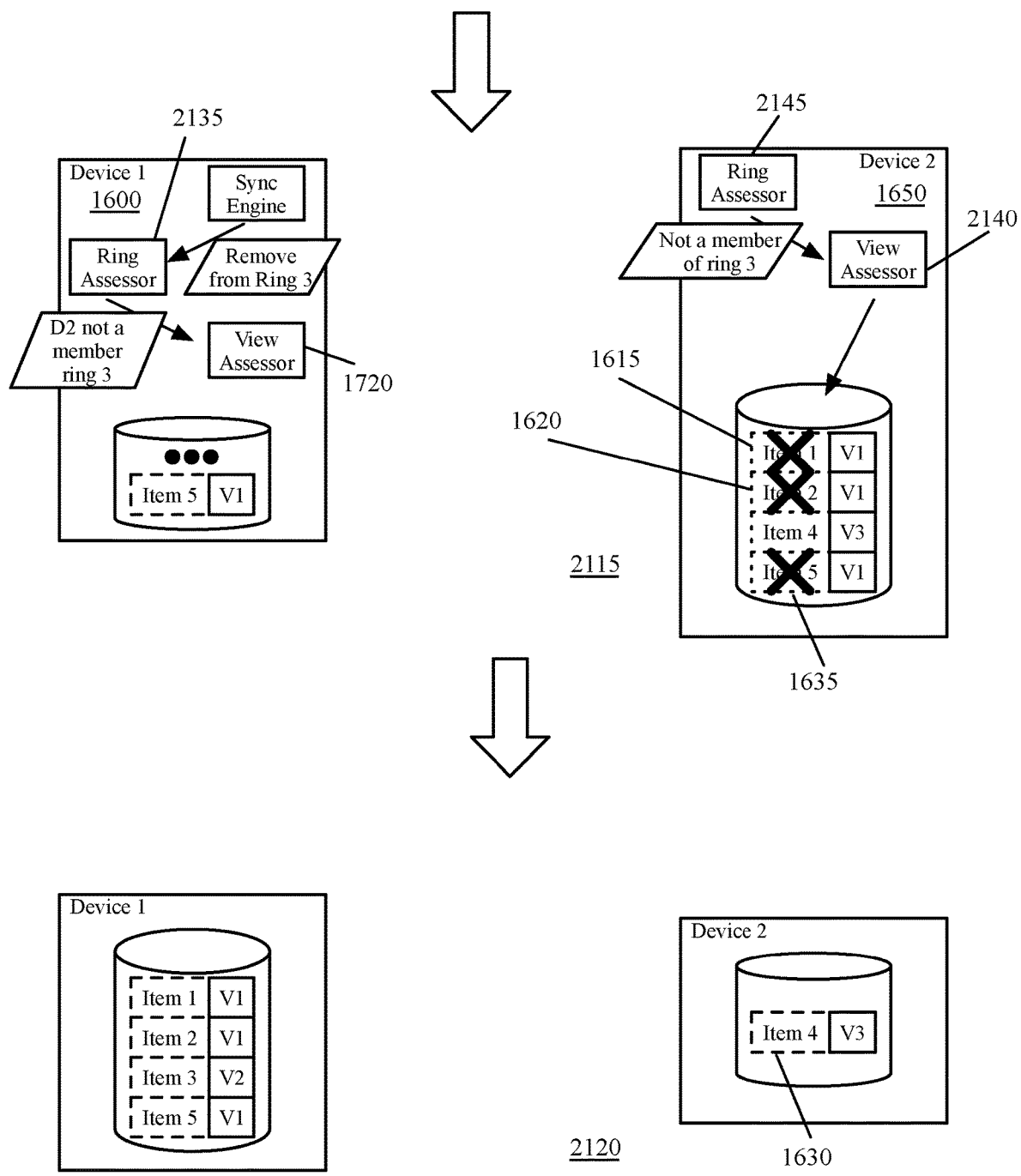

FIGS. 21A-B illustrate the devices 1600 and 1650 from FIGS. 16 and 17 when one of the devices has its password changed such that it is removed from a ring, over four stages 2105-2120. As shown in the first stage 2105, the second device 1650 stores the synchronization data items 1615, 1620, and 1635, which belong to the view V1, as well as the data item 1630 belonging to the view V3. At this stage, the user of the device 1650 modifies its passcode from a 12-digit passcode ("012345678910") to the 4-digit passcode "1234".

As a result, in the second stage 2110, the ring assessor 2125 of the second device 1650 identifies that the device should no longer be a member of a ring (Ring 3), because its passcode is no longer long enough. Therefore, the second device 1650 sends a message 2130 to the first device 1600 notifying the first device that the second device is no longer a member of ring 3. In some embodiments, as shown, the message indicates the reason for the change in ring status, though other embodiments simply send out the notification without additional data.

In the third stage, both the first device 1600 and second device 1650 process the removal of the second device from Ring 3. The ring assessor 2135 on the first device notes the removal of the second device from this ring, and also notifies the view assessor 1720 of the change in ring status, so that the view assessor can determine for future synchronization operations whether the view status of the second device has changed at all. On the second device, the ring assessor 2125 notifies the view assessor 2140 of this same change, and the view assessor identifies that the second device 1650 should no longer participate in the view V1 as a result (i.e., because ring 3 membership is a requirement for the view V1).

Accordingly, the view assessor 2140 removes the data items 1615, 1620, and 1635 from the second device, as these belong to the view V1 in which the device no longer participates. The fourth stage 2140 shows this result, with the second device 1650 only storing the item 1630 (which belongs to the view V3).

VI. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 22:
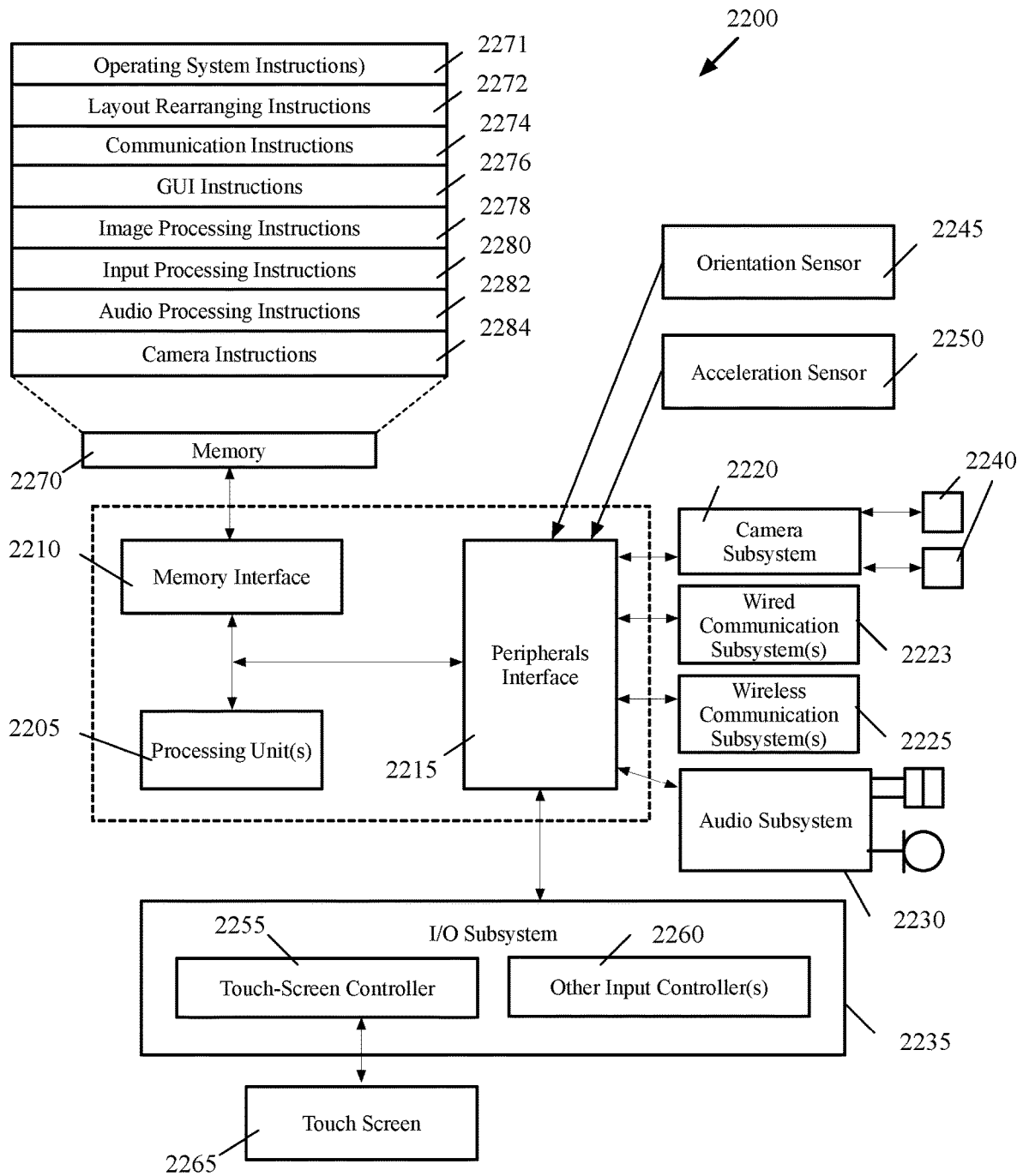
FIG. 22 illustrates an example of an architecture of a mobile computing device with which some embodiments are implemented.

The user data sharing of some embodiments occurs on mobile devices, such as smart phones (e.g., iPhones®) and tablets (e.g., iPads®). FIG. 22 is an example of an architecture 2200 of such a mobile computing device. As shown, the mobile computing device 2200 includes one or more processing units 2205, a memory interface 2210 and a peripherals interface 2215.

The peripherals interface 2215 is coupled to various sensors and subsystems, including a camera subsystem 2220, a wired communication subsystem(s) 2223, a wireless communication subsystem(s) 2225, an audio subsystem 2230, an I/O subsystem 2235, etc. The peripherals interface 2215 enables communication between the processing units 2205 and various peripherals. For example, an orientation sensor 2245 (e.g., a gyroscope) and an acceleration sensor 2250 (e.g., an accelerometer) is coupled to the peripherals interface 2215 to facilitate orientation and acceleration functions.

The camera subsystem 2220 is coupled to one or more optical sensors 2240 (e.g., a charged coupled device (CCD) optical sensor, a complementary metal oxide semiconductor (CMOS) optical sensor, etc.). The camera subsystem 2220 coupled with the optical sensors 2240 facilitates camera functions, such as image and/or video data capturing. The wired communication subsystem 2223 and wireless communication subsystem 2225 serve to facilitate communication functions.

In some embodiments, the wireless communication subsystem 2225 includes radio frequency receivers and transmitters, and optical receivers and transmitters (not shown in FIG. 22). These receivers and transmitters of some embodiments are implemented to operate over one or more communication networks such as a GSM network, a Wi-Fi network, a Bluetooth network, etc. The audio subsystem 2230 is coupled to a speaker to output audio (e.g., to output voice navigation instructions). Additionally, the audio subsystem 2230 is coupled to a microphone to facilitate voice enabled functions in some embodiments.

The I/O subsystem 2235 involves the transfer between input/output peripheral devices, such as a display, a touch screen, etc., and the data bus of the processing units 2205 through the peripherals interface 2215. The I/O subsystem 2235 includes a touch-screen controller 2255 and other input controllers 2260 to facilitate the transfer between input/output peripheral devices and the data bus of the processing units 2205. As shown, the touch screen controller 2255 is coupled to a touch screen 2265. The touch screen controller 2255 detects contact and movement on the touch screen 2265 using any of multiple touch sensitivity technologies. The other input controllers 2260 are coupled to other input/control devices, such as one or more buttons. Some embodiments include a near-touch sensitive screen and a corresponding controller that can detect near-touch interactions instead of or in addition to touch interactions.

The memory interface 2210 is coupled to memory 2270. In some embodiments, the memory 2270 includes volatile memory (e.g., high speed random access memory), non volatile memory (e.g., flash memory), a combination of volatile and non volatile memory, and/or any other type of memory. As illustrated in FIG. 22, the memory 2270 stores an operating system (OS) 2271. The OS 2271 includes instructions for handling basic system services and for performing hardware dependent tasks.

The memory 2270 also includes communication instructions 2274 to facilitate communicating with one or more additional devices (e.g., for peer-to-peer data sharing, or to connect to a server through the Internet for cloud-based data sharing); graphical user interface instructions 2276 to facilitate graphic user interface processing; image processing instructions 2278 to facilitate image related processing and functions; input processing instructions 2280 to facilitate input related (e.g., touch input) processes and functions; audio processing instructions 2282 to facilitate audio related processes and functions; and camera instructions 2284 to facilitate camera related processes and functions. The instructions described above are merely exemplary and the memory 2270 includes additional and/or other instructions in some embodiments. For instance, the memory for a smartphone may include phone instructions to facilitate phone related processes and functions. The above identified instructions need not be implemented as separate software programs or modules. Various functions of the mobile computing device can be implemented in hardware and/or in software, including in one or more signal processing and/or application specific integrated circuits.

While the components illustrated in FIG. 22 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 22 may be split into two or more integrated circuits.

B. Computer System

Figure 23:
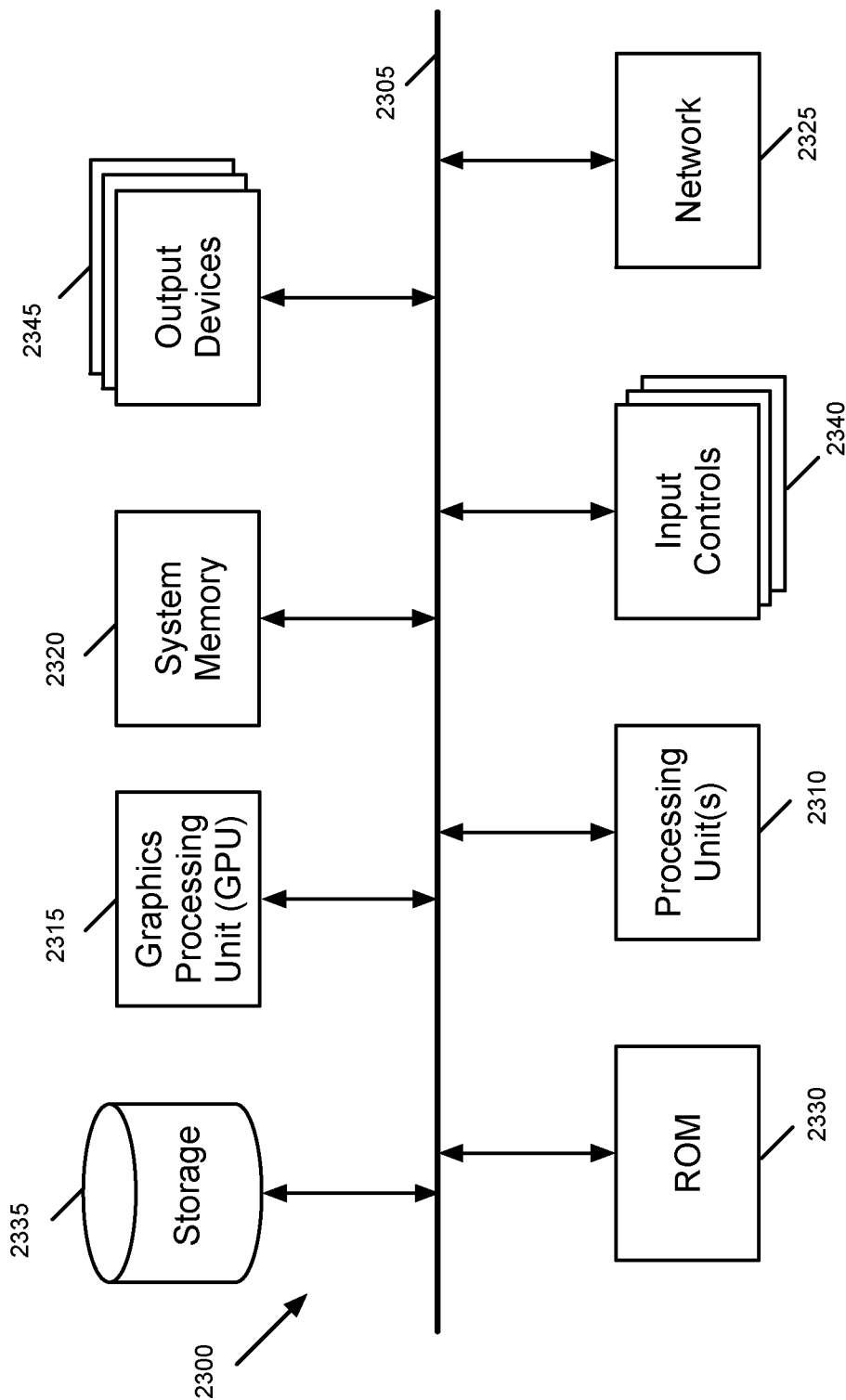
FIG. 23 conceptually illustrates another example of an electronic system with which some embodiments of the invention are implemented.

FIG. 23 conceptually illustrates another example of an electronic system 2300 with which some embodiments of the invention are implemented. The electronic system 2300 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2300 includes a bus 2305, processing unit(s) 2310, a graphics processing unit (GPU) 2315, a system memory 2320, a network 2325, a read-only memory 2330, a permanent storage device 2335, input devices 2340, and output devices 2345.

The bus 2305 collectively represents all system, peripheral, and chipset buses that communicatively connect the numerous internal devices of the electronic system 2300. For instance, the bus 2305 communicatively connects the processing unit(s) 2310 with the read-only memory 2330, the GPU 2315, the system memory 2320, and the permanent storage device 2335.

From these various memory units, the processing unit(s) 2310 retrieves instructions to execute and data to process in order to execute the processes of the invention. The processing unit(s) may be a single processor or a multi-core processor in different embodiments. Some instructions are passed to and executed by the GPU 2315. The GPU 2315 can offload various computations or complement the image processing provided by the processing unit(s) 2310. In some embodiments, such functionality can be provided using CoreImage's kernel shading language.

The read-only-memory (ROM) 2330 stores static data and instructions that are needed by the processing unit(s) 2310 and other modules of the electronic system. The permanent storage device 2335, on the other hand, is a read-and-write memory device. This device is a non-volatile memory unit that stores instructions and data even when the electronic system 2300 is off. Some embodiments of the invention use a mass-storage device (such as a magnetic or optical disk and its corresponding disk drive, integrated flash memory) as the permanent storage device 2335.

Other embodiments use a removable storage device (such as a floppy disk, flash memory device, etc., and its corresponding drive) as the permanent storage device. Like the permanent storage device 2335, the system memory 2320 is a read-and-write memory device. However, unlike storage device 2335, the system memory 2320 is a volatile read-and-write memory, such a random access memory. The system memory 2320 stores some of the instructions and data that the processor needs at runtime. In some embodiments, the invention's processes are stored in the system memory 2320, the permanent storage device 2335, and/or the read-only memory 2330. For example, the various memory units include instructions for processing multimedia clips in accordance with some embodiments. From these various memory units, the processing unit(s) 2310 retrieves instructions to execute and data to process in order to execute the processes of some embodiments.

The bus 2305 also connects to the input and output devices 2340 and 2345. The input devices 2340 enable the user to communicate information and select commands to the electronic system. The input devices 2340 include alphanumeric keyboards and pointing devices (also called "cursor control devices"), cameras (e.g., webcams), microphones or similar devices for receiving voice commands, etc. The output devices 2345 display images generated by the electronic system or otherwise output data. The output devices 2345 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 23, bus 2305 also couples electronic system 2300 to a network 2325 through a network adapter (not shown). In this manner, the computer can be a part of a network of computers (such as a local area network ("LAN"), a wide area network ("WAN"), or an Intranet), or a network of networks, such as the Internet. Any or all components of electronic system 2300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, a number of the figures (including FIGS. 11, 12, 15, and 20) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method implemented by a first computing device, the method comprising:
   establishing at least one cryptographic key;
   identifying, based on the at least one cryptographic key, a particular synchronization sub-group to which the at least one cryptographic key corresponds, wherein the particular synchronization sub-group is identified based on a file type associated with the at least one cryptographic key, a software application with which the at least one cryptographic key is associated, or some combination thereof;
   tagging the at least one cryptographic key as being included in the particular synchronization sub-group; and
   in response to determining that the first computing device and a second computing device both participate in the particular synchronization sub-group:
      forming a secure channel with the second computing device,
      encrypting, based on requirements of the secure channel used for communicating with the second computing device, the at least one cryptographic key to produce at least one encrypted cryptographic key, and
      sending, over the secure channel, the at least one encrypted cryptographic key to the second computing device.

2. The method of claim 1, wherein the secure channel is formed with the second computing device using an Off-the-Record (OTR) messaging protocol.

3. The method of claim 1, wherein establishing the at least one cryptographic key comprises:
   receiving information through an application executing on the first computing device, and
   generating the at least one cryptographic key based on the information.

4. The method of claim 3, wherein the information comprises:
   a username and a password, and/or
   a cryptographic credential.

5. The method of claim 1, wherein the at least one cryptographic key is encrypted using a shared key for encrypting messages transmitted over the secure channel.

6. The method of claim 1, further comprising, prior to sending the at least one encrypted cryptographic key to the second computing device:
   encrypting the at least one encrypted cryptographic key using an additional key that is required to be possessed by both the first and second computing devices in order to participate in the particular synchronization sub-group.

7. At least one non-transitory computer readable storage medium configured to store instructions that, when executed by at least one processor included in a first computing device, cause the first computing device to carry out steps that include:
   establishing at least one cryptographic key;
   identifying, based on the at least one cryptographic key, a particular synchronization sub-group to which the at least one cryptographic key corresponds, wherein the particular synchronization sub-group is identified based on a file type associated with the at least one cryptographic key, a software application with which the at least one cryptographic key is associated, or some combination thereof;
   tagging the at least one cryptographic key as being included in the particular synchronization sub-group; and
   in response to determining that the first computing device and a second computing device both participate in the particular synchronization sub-group:
      forming a secure channel with the second computing device,
      encrypting, based on requirements of the secure channel used for communicating with the second computing device, the at least one cryptographic key to produce at least one encrypted cryptographic key, and
      sending, over the secure channel, the at least one encrypted cryptographic key to the second computing device.

8. The at least one non-transitory computer readable storage medium of claim 7, wherein the secure channel is formed with the second computing device using an Off-the-Record (OTR) messaging protocol.

9. The at least one non-transitory computer readable storage medium of claim 7, wherein establishing the at least one cryptographic key comprises:
   receiving information through an application executing on the first computing device, and
   generating the at least one cryptographic key based on the information.

10. The at least one non-transitory computer readable storage medium of claim 9, wherein the information comprises:
   a username and a password, and/or
   a cryptographic credential.

11. The at least one non-transitory computer readable storage medium of claim 7, wherein the at least one cryptographic key is encrypted using a shared key for encrypting messages transmitted over the secure channel.

12. The at least one non-transitory computer readable storage medium of claim 7, wherein the steps further include, prior to sending the at least one encrypted cryptographic key to the second computing device:
   encrypting the at least one encrypted cryptographic key using an additional key that is required to be possessed by both the first and second computing devices in order to participate in the particular synchronization sub-group.

13. A first computing device, comprising:
   at least one processor; and
   at least one memory storing instructions that, when executed by the at least one processor, cause the first computing device to carry out steps that include:
      establishing at least one cryptographic key;
      identifying, based on the at least one cryptographic key, a particular synchronization sub-group to which the at least one cryptographic key corresponds, wherein the particular synchronization sub-group is identified based on a file type associated with the at least one cryptographic key, a software application with which the at least one cryptographic key is associated, or some combination thereof;
      tagging the at least one cryptographic key as being included in the particular synchronization sub-group; and
      in response to determining that the first computing device and a second computing device both participate in the particular synchronization sub-group:
         forming a secure channel with the second computing device,
         encrypting, based on requirements of the secure channel used for communicating with the second computing device, the at least one cryptographic key to produce at least one encrypted cryptographic key, and
         sending, over the secure channel, the at least one encrypted cryptographic key to the second computing device.

14. The first computing device of claim 13, wherein the secure channel is formed with the second computing device using an Off-the-Record (OTR) messaging protocol.

15. The first computing device of claim 13, wherein establishing the at least one cryptographic key comprises:
   receiving information through an application executing on the first computing device, and
   generating the at least one cryptographic key based on the information.

16. The first computing device of claim 15, wherein the information comprises:
   a username and a password, and/or
   a cryptographic credential.

17. The first computing device of claim 13, wherein the at least one cryptographic key is encrypted using a shared key for encrypting messages transmitted over the secure channel.

* * * * *